(12) United States Patent
Wu et al.

(10) Patent No.: US 11,856,560 B2
(45) Date of Patent: Dec. 26, 2023

(54) SYSTEM INFORMATION TRANSMISSION METHOD, AND RELATED DEVICE AND SYSTEM

(71) Applicant: HUAWEI TECHNOLOGIES CO., LTD., Guangdong (CN)

(72) Inventors: Ji Wu, Shanghai (CN); Jun Zhu, Shenzhen (CN); Qiong Jia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 529 days.

(21) Appl. No.: 17/172,432

(22) Filed: Feb. 10, 2021

(65) Prior Publication Data

US 2021/0176748 A1 Jun. 10, 2021

Related U.S. Application Data

(63) Continuation of application No. PCT/CN2019/100094, filed on Aug. 9, 2019.

(30) Foreign Application Priority Data

Aug. 10, 2018 (CN) .......................... 201810920963.1

(51) Int. Cl.
*H04W 72/0446* (2023.01)
*H04W 74/08* (2009.01)
*H04W 72/23* (2023.01)

(52) U.S. Cl.
CPC ....... *H04W 72/0446* (2013.01); *H04W 72/23* (2023.01); *H04W 74/0808* (2013.01)

(58) Field of Classification Search
CPC ............. H04W 72/0446; H04W 72/23; H04W 74/0808; H04W 48/12; H04W 48/14;
(Continued)

(56) References Cited

U.S. PATENT DOCUMENTS

2018/0048413 A1 2/2018 Liu et al.
2018/0192383 A1 7/2018 Nam et al.
(Continued)

FOREIGN PATENT DOCUMENTS

CN 103428813 A 12/2013
CN 106888507 A 6/2017
(Continued)

OTHER PUBLICATIONS

Office Action issued in Chinese Application No. 201810920963.1 dated Feb. 9, 2022, 10 pages.
(Continued)

*Primary Examiner* — Tejis Daya
(74) *Attorney, Agent, or Firm* — Fish & Richardson P.C.

(57) ABSTRACT

This application provides a system information transmission method, and a related device and system. The method includes: receiving, by a network device, a system information request sent by one or more terminals; transmitting, by the network device, system information SI, where SI transmitted for one terminal has a quasi-co-location QCL with a portion of downlink signal blocks, and the portion of downlink signal blocks are a subset of all downlink signal blocks transmitted by the network device; and sending, by the network device, first indication information, where the first indication information indicates a mapping between a downlink signal block and SI, and the downlink signal block has a QCL with the SI corresponding to the downlink signal block. The foregoing solution can reduce system overheads and improve resource utilization.

20 Claims, 17 Drawing Sheets

(58) Field of Classification Search
CPC ..... H04W 72/046; Y02D 30/70; H04L 5/001; H04L 5/0023; H04L 5/0053; H04L 5/0094; H04B 7/0617
See application file for complete search history.

(56) References Cited

U.S. PATENT DOCUMENTS

| | | | |
|---|---|---|---|
| 2018/0205585 A1 | 7/2018 | Sadiq et al. | |
| 2018/0262313 A1* | 9/2018 | Nam | H04L 5/0044 |
| 2018/0324843 A1* | 11/2018 | Lee | H04W 72/23 |
| 2020/0120634 A1* | 4/2020 | Lee | H04W 68/02 |

FOREIGN PATENT DOCUMENTS

| | | |
|---|---|---|
| CN | 107888369 A | 4/2018 |
| CN | 108141737 A | 6/2018 |
| WO | 2018028368 A1 | 2/2018 |
| WO | 2018111034 A1 | 6/2018 |

OTHER PUBLICATIONS

Extended European Search Report issued in European Application No. 19848253.1 dated Sep. 15, 2021, 21 pages.
OPPO, "Discussion on Impact of LBT to Minimum System Information for NR-U," 3GPP TSG-RAN2 Ad Hoc Meeting #1807, R2-1809807, Montreal, Canada, Jul. 2-6, 2018, 4 pages.
Samsung, "Summary on A.I. 7.1.2.3: Remaining details on other system information delivery," 3GPP TSG RAN WG1 Meeting #91, R1-1721450, Reno, USA, Nov. 27-Dec. 1, 2017, 8 pages.
ZTE, Sanechips, "OSI delivery," 3GPP TSG RAN WG1 Meeting #91, R1-1719343, Reno, USA, Nov. 27-Dec. 1, 2017, 8 pages.
ZTE, Sanechips, "Remaining details of RMSI," 3GPP TSG RAN WG1 Meeting #90bis, R1-1717032, Prague, Czech Republic, Oct. 9-13, 2017, 12 pages.
Ericsson, "Other system information delivery," 3GPP TSG RAN WG1 Meeting #90bis, R1-1718713, Prague, Czech Republic, Oct. 9-13, 2017, 3 pages.
PCT International Search Report and Written Opinion issued in International Application No. PCT/CN2019/100094 dated Oct. 30, 2019, 16 pages (with English translation).
Samsung, "Summary on A.I. 7.1.2.3: Remaining details on other system information delivery," 3GPP TSG RAN WG1 Meeting #91, R1-1721534, Reno, USA, Nov. 27-Dec. 1, 2017, 10 pages.
ZTE et al., "OSI delivery," 3GPP TSG RAN WG1 Meeting #91, R1-1719343, Reno, USA, Nov. 27-Dec. 1, 2017, 8 pages.
ZTE, "Remaining details of OSI delivery," 3GPP TSG RAN WG1 NR Ad-Hoc#3, R1-1715379, Nagoya, Japan, Sep. 18-21, 2017, 4 pages.
Office Action issued in Chinese Application No. 201810920963.1 dated Aug. 3, 2021, 6 pages.
Samsung, "Summary on A.I. 7.1.2.3: Remaining details on other system information delivery," 3GPP TSG RAN WG1 Meeting #91, R1-1721412, Reno, USA, Nov. 27-Dec. 1, 2017, 8 pages.

* cited by examiner

Base station transmit beams for transmitting different SS/PBCH blocks

SYSTEM INFORMATION TRANSMISSION METHOD, AND RELATED DEVICE AND SYSTEM

CROSS-REFERENCE TO RELATED APPLICATIONS

This application is a continuation of International Application No. PCT/CN2019.100094, filed on Aug. 9, 2019, which claims priority to Chinese Patent Application No. 201810920963.1, filed on Aug. 10, 2018. The disclosures of the aforementioned applications are hereby incorporated by reference in their entireties.

TECHNICAL FIELD

This application relates to the field of wireless communications technologies, and in particular, to a system information transmission method, and a related device and system.

BACKGROUND

In a long term evolution (LTE) system, system information is classified into a master information block (master information block. MIB) and several system information blocks (system information blocks, SIBs). The MIB is carried in a broadcast channel (broadcast channel, BCH). A manner of sending the MIB is shown in FIG. 1A. The MIB remains unchanged within 80 ms, is repeatedly sent for four times within 80 ms, and occupies frequency domain resources of 72 subcarriers in total on both sides of a channel center bandwidth. The MIB carries basic information required for accessing the network and indication information of SIB 1, such as a time-frequency resource location and an information resource block size. After obtaining MIB information, user equipment (user equipment. UE) may further obtain SIB 1 based on the indication information. A manner of sending SIB 1 in LTE is shown in FIG. 1B. SIB 1 remains unchanged within 80 ms, is repeatedly sent for four times within 80 ms, and is always sent in the fifth subframe in a 10 ms radio frame.

In a new radio (new radio, NR) system, system information is classified into a master information block (master information block, MIB), remaining minimum system information (remaining minimum system information, RMSI), and other system information (other system information, OSI). The MIB is carried in a physical broadcast channel PBCH, and the RMSI is carried in an RMSI physical downlink shared channel (physical downlink shared channel, PDSCH). The RMSI is similar to SIB 1 in LTE. The difference between the RMSI and SIB 1 is that SIB 1 has fixed transmission period location. To improve system scheduling flexibility, time-frequency resource location and size of the RMSI PDSCH of NR are changeable. Specific parameters are indicated by an RMSI CORESET (which is similar to a PDCCH in LTE and also carries DCI information). The OSI is similar to SIBs 2 to 13 in LTE. Specific information carried in the OS and a sending period of the OS are indicated by the RMSI.

System information is very important for an initial access procedure and normal operation of user equipment (user equipment, UE). In NR, the OSI is further classified into broadcast OSI (broadcast OSI) and on-demand OSI (on-demand OS). Like the PBCH and the RMSI, the broadcast OSI is periodically broadcast and sent by a base station (gNB), and configuration information of the broadcast OSI is carried in the RMSI.

Periodically sending system information increases system overheads and reduces resource utilization. For a multi-beam (beam) system, system information needs to be repeatedly sent in all beam directions, to further increase system overheads. To improve system efficiency, for the on-demand OSI, the gNB does not send the on-demand OSI if not receiving a request from the UE. The UE may request the gNB to send some on-demand OSI, or may request the gNB to send all on-demand OSI (the on-demand OSI includes one or more SIBs). However, after the gNB receives a request for sending all or some on-demand OSI, the all or some on-demand OSI becomes broadcast OSI, and is periodically broadcast and sent by the gNB repeatedly in all beam directions. The existing manner of sending the on-demand OSI still causes relatively high system overheads.

SUMMARY

This application provides a system information transmission method, and a related device and system, to reduce system overheads and improve resource utilization.

According to a first aspect, this application provides a system information transmission method, applied to a network device side. The method may include: The network device receives a system information request sent by one or more terminals, and transmits system information SI based on the system information request, where the SI transmitted for one terminal has a quasi co-location QCL with only a portion of downlink signal blocks, and the portion of downlink signal blocks are a subset of all downlink signal blocks transmitted by the network device. In addition, the network device further broadcasts first indication information, where the first indication information indicates a mapping between a downlink signal block and SI, and the downlink signal block has a QCL with the SI corresponding to the downlink signal block.

According to a second aspect, this application provides a system information transmission method, applied to a terminal side. The method may include: The terminal receives first indication information broadcast by a network device, where the first indication information indicates a mapping between a downlink signal block and SI, and the downlink signal block has a QCL with the SI corresponding to the downlink signal block. The terminal determines, based on the first indication information, whether SI having a QCL with the downlink signal block received by the terminal has been sent. If the SI that has a QCL with the downlink signal block received by the terminal and that needs to be obtained by the terminal has been sent, the terminal detects the SI at a time location that corresponds to the received downlink signal block and that is used to receive SI; and if the SI that has a QCL with the downlink signal block received by the terminal and that needs to be obtained by the terminal has not been sent, the terminal sends a system information request to the network device, and then receives SI transmitted by the network device. The SI transmitted by the network device for a specific terminal has a quasi co-location QCL with only a portion of downlink signal blocks, and the portion of downlink signal blocks are a subset of all downlink signal blocks transmitted by the network device.

In the solutions described in the first aspect and the second aspect, indicating a base station transmitted beam may be equivalent to indicating a downlink signal, for example, an SS/PBCH block or a CSI-RS, transmitted in the beam direction. In this application, the downlink signal may be referred to as a downlink signal block. Indicating SI carried in a base station transmitted beam may be equivalent to indicating SI having a quasi co-location QCL with a downlink signal block transmitted in a direction of the base station transmitted beam. For example, SI carried in base station transmitted beam 1 is SI having a quasi co-location with SS/PBCH block 1 transmitted in the beam 1 direction.

In this application, the SI corresponding to the downlink signal block is SI transmitted by the network device in a beam direction in which the downlink signal block is transmitted. In other words, the first indication information may indicate a case in which different base station transmitted beams carry SI, that is, indicate which pieces of SI are carried or not carried in different base station transmitted beams.

According to the methods described in the first aspect and the second aspect, for an SI request sent by a specific terminal, the network device transmits SI by using only some base station transmitted beams, instead of using all base station transmitted beams. In this way, system overheads can be reduced. In addition, based on an indication of the network device, the terminal no longer needs to request, from the network device, SI that has been requested by another terminal or the terminal itself, and only needs to detect the SI at a resource location that corresponds to the downlink signal block received by the terminal and that is used to transmit SI. In this way, the terminal in a cell can be prevented from repeatedly requesting SI available in the cell, thereby reducing system overheads.

With reference to the first aspect or the second aspect, for a specific terminal, the network device may determine the portion of downlink signal blocks in, but not limited to, the following several manners:

Manner 1: A downlink signal block having a QCL with an SI request received by the network device. In other words, for the specific terminal, some base station transmitted beams used by the network device to transmit SI may include: a base station transmitted beam having a QCL with a base station received beam used by the network device to receive the SI request, or further include P (P is a positive integer) adjacent beams of the base station transmitted beam.

Manner 2: A downlink signal block having a QCL with an SI request transmitted by the specific terminal. In other words, for the specific terminal, some base station transmitted beams used by the network device to transmit SI may include: a base station transmitted beam having a QCL with a terminal transmitted beam used by the specific terminal to transmit the SI request, or further include Q (Q is a positive integer) adjacent beams of the base station transmitted beam.

Manner 3: A downlink signal block indicated by the specific terminal. In other words, the specific terminal may indicate, to the network device, which base station transmitted beam or which base station transmitted beams are used to transmit SI.

Manner 4: A downlink signal block configured by a system. In other words, the system may configure some base station transmitted beams for the network device to transmit SI. Optionally, in a scenario in which the terminal is stationary or a movement range of the terminal is very limited, the system may configure, for the terminal, some base station transmitted beams for transmitting SI.

It can be learned that, for a specific terminal, the network device sends SI only in a beam direction in which the network device receives the SI request, or in the beam direction and some adjacent beam directions, or in a beam direction in which the terminal sends the SI request, or in the beam direction and some adjacent beam directions, or in a beam direction configured by the system, or in a beam direction requested by the terminal, to greatly reduce system overheads required for sending the SI, and improve system efficiency.

With reference to the first aspect or the second aspect, two main implementations of the first indication information may include:

Implementation 1: The first indication information may include H groups of bits, each group of bits includes M bits, one bit corresponds to one piece of SI, and a $j^{th}$ piece of bit in an $i^{th}$ group of bits indicates whether $j^{th}$ piece of SI corresponding to an $i^{th}$ downlink signal block has been sent. H is a positive integer, M is a positive integer, $i \in (1, H)$, $j \in (1, M)$, i is a positive integer, and j is a positive integer.

Optionally, when a value of the $j^{th}$ piece of bit in the $i^{th}$ group of bits is '1', it may indicate that the $j^{th}$ SI corresponding to the it downlink signal block has been sent by the network device. When the value of the $j^{th}$ piece of bit in the $i^{th}$ group of bits is '0', it may indicate that the $j^{th}$ SI corresponding to the it downlink signal block has not been sent by the network device. This is not limited thereto, and it may also be specified that the bit value '0' indicates that the corresponding SI has been sent by the network device, and the bit value '1' indicates that the corresponding SI has not been sent by the network device. In actual application, a plurality of bits may alternatively be used to correspond to one piece of SI.

Implementation 2: The first indication information may include: W groups of bits, one group of bits corresponds to one piece of SI, each group of bits includes Y bits, and one bit corresponds to one downlink signal block. An $n^{th}$ bit in an $m^{th}$ group of bits indicates whether $m^{th}$ piece of SI corresponding to an $n^{th}$ downlink signal block has been sent. W is a positive integer, Y is a positive integer, $m \in (1, W)$, $n \in (1, Y)$, m is a positive integer, and n is a positive integer.

Optionally, when a value of the $n^{th}$ bit in the $m^{th}$ group of bits is '1', it may indicate that the $m^{th}$ SI corresponding to the $n^{th}$ downlink signal block has been sent by the network device. When the value of the $n^{th}$ bit in the $m^{th}$ group of bits is '0', it may indicate that the $m^{th}$ SI corresponding to the $n^{th}$ downlink signal block has not been sent by the network device. This is not limited thereto, and it may also be specified that the bit value '0' indicates that the corresponding SI has been sent by the network device, and the bit value '1' indicates that the corresponding SI has not been sent by the network device. In actual application, a plurality of bits may alternatively be used to correspond to one downlink signal block.

Optionally, when the SI is specifically on-demand OSI, the first indication information may be carried in one or more of the following: remaining minimum system information RMSI and an SS/PBCH block. This is not limited thereto, and the first indication information may alternatively be carried in independent signaling.

It may be inferred that when there are a relatively large quantity of downlink signal blocks or a relatively large amount of SI, a large quantity of bits are required for the implementation of the first indication information. For example, when the network device transmits eight SS/PBCH blocks, and each SS/PBCH block corresponds to eight pieces of SI, the first indication information needs 64 (64=8*8) bits. In this case, signaling overheads required by the first indication information are relatively large.

Further, to reduce signaling overheads required by the first indication information, the first indication information may use, but not limited to, the following several implementations:

(1) Manner 1: For a plurality of downlink signal blocks (for example, SS/PBCH blocks) having a QCL, the first indication information may indicate a transmission status of SI corresponding to only one downlink signal block. For example, if the network device transmits eight SS/PBCH blocks, where SS/PBCH block 1 and SS/PBCH block 2 have a QCL, and SS/PBCH block 3 and SS/PBCH block 4 have a QCL. SS/PBCH block 5 and SS/PBCH block 6 have a QCL, and SS/PBCH block 7 and SS/PBCH block 8 have a QCL, the first indication information only needs to indicate sending statuses of SI corresponding to SS/PBCH blocks 1, 3, 5, and 7, or only needs to indicate sending statuses of SI corresponding to SS/PBCH blocks 2, 4, 6, and 8.

In other words, the first indication information may indicate a mapping between only one of a plurality of downlink signal blocks and SI. The plurality of downlink signal blocks have a QCL. Transmission statuses of SI corresponding to the downlink signal blocks having the QCL are the same.

Optionally, the downlink signal blocks having the QCL may be indicated by the network device. The network device may send second indication information, where the second indication information may indicate the downlink signal blocks having the QCL. Optionally, the downlink signal blocks having the QCL may alternatively be statically defined in a protocol or configured by the network device by using higher layer signaling (for example, radio resource control (radio resource control, RRC) signaling).

Optionally, when the SI is specifically on-demand OSI, the second indication information may be carried in one or more of the following: remaining minimum system information RMSI and an SS/PBCH block. This is not limited thereto, and the second indication information may alternatively be carried in independent signaling.

(2) Manner 2: For a plurality of pieces of SI having a binding sending relationship, the first indication information may indicate a transmission status of only one of the plurality pieces of SI corresponding to different downlink signal blocks (for example, SS/PBCH blocks). For example, if in eight pieces of SI (SIB 1 to SIB 8), SIB 1 and SIB 2 have a binding sending relationship, SIB 3 and SIB 4 have a binding sending relationship, SIB 5 and SIB 6 have a binding sending relationship, and SIB 7 and SIB 8 have a binding sending relationship, the first indication information only needs to indicate sending statuses of SIBs 1, 3, 5, and 7 corresponding to different SS/PBCH blocks, or only needs to indicate sending statuses of SIBs 2, 4, 6, and 8 corresponding to different SS/PBCH blocks.

In other words, the first indication information may indicate a mapping between one or more downlink signal blocks and only one of the plurality of pieces of SI, and the plurality of pieces of SI have a binding sending relationship. Herein, that the plurality of pieces of SI have a binding sending relationship means that downlink signal blocks corresponding to the plurality of pieces of SI are the same and the plurality of pieces of SI need to be sent together. To be specific, the plurality of pieces of SI are transmitted together or not transmitted together in a same beam direction. Optionally, a plurality of pieces of SI of a same type have a binding sending relationship, and need to be sent together.

Optionally, SI that needs to be sent together (that is, SI having a binding sending relationship) may be indicated by the network device. The network device may send third indication information, where the third indication information may indicate SI that needs to be sent together. Optionally, the third indication information may indicate SI of a same type, and the SI of a same type needs to be sent together. Optionally, SI that needs to be sent together may alternatively be statically defined in a protocol or configured by the network device by using higher layer signaling (for example, RRC signaling). For example, SI of a type same as the type of the SI statically defined in the protocol or configured by using the higher layer signaling needs to be sent together.

Optionally, when the SI is specifically on-demand OSI, the third indication information may be carried in one or more of the following: remaining minimum system information RMSI and an SS/PBCH block. This is not limited thereto, and the third indication information may alternatively be carried in independent signaling.

(3) Manner 3: In addition to separately using the foregoing Manner 1 or the foregoing Manner 2 to indicate the sending status of the SI, the network device may alternatively use both the foregoing Manner 1 and the foregoing Manner 2 to indicate the sending status of the SI, so that signaling overheads can be reduced to a greater extent.

With reference to the first aspect or the second aspect, a resource configuration manner of SI may include:

Manner 1: A time location that corresponds to the downlink signal block and that is used to send SI is preconfigured. Specifically, a time location of SI having a QCL with a downlink signal block is a preset time location that corresponds to the downlink signal block in a first time window and that is used to send S.

In a possible case, a blank symbol may exist, in the first time window, between a preset time location corresponding to downlink signal blocks corresponding to SI transmitted by the network device. The blank symbol is a symbol that is not occupied by the SI. In an NRU scenario, the blank symbol causes discontinuous transmission, resulting in a channel loss. In this regard, optionally, the blank symbol may be filled by a second downlink signal, to avoid the channel loss caused by the discontinuous data transmission. The second downlink signal may be a downlink data signal or the like.

In Manner 1, for a specific terminal, the terminal may receive SI at a preset time location corresponding to a portion of downlink signal blocks in the first time window. The portion of downlink signal blocks have a QCL with SI transmitted by the network device for the terminal.

Manner 2: A time location for sending SI is dynamically allocated by the network device. Specifically, the network device dynamically allocates time locations of SI having a QCL with downlink signal blocks, so that the SI is continuously sent. In other words, in Manner 2, time locations at which the network device transmits the SI are continuous. In this way, a blank symbol can be avoided. For an unlicensed spectrum, the network device does not need to fill a second downlink signal during transmission of the SI.

In Manner 2, the network device may send fourth indication information, where the fourth indication information indicates time locations at which SI having a QCL with different downlink signal blocks is actually transmitted by the network device. For a specific terminal, the terminal may receive the fourth indication information, determine, based on the fourth indication information, time locations of SI having a QCL with a portion of downlink signal blocks, and receive the SI at the time locations. The portion of downlink signal blocks have a QCL with the SI transmitted by the network device for the terminal. Optionally, the terminal may alternatively receive the SI through blind detection, and the network device does not need to send the fourth indication information.

In an unlicensed band, for a specific terminal, the network device may perform LBT on an antenna port having a QCL with a portion of downlink signal blocks. If the LBT passes, the network device only transmits system information SI having a QCL with the portion of downlink signal blocks. In other words, for the specific terminal, the network device can transmit the SI in directions of some base station transmitted beams only by performing LBT in the directions of the some base station transmitted beams instead of directions of all base station transmitted beams. In this way, the LBT success probability can be increased, and the success probability of sending the SI can be increased, because directional LBT is easier than omnidirectional LBT.

According to a third aspect, a network device is provided, including a plurality of functional units, configured to correspondingly perform the method according to any possible implementation of the first aspect.

According to a fourth aspect, a terminal is provided, including a plurality of functional units, configured to correspondingly perform the method according to any possible implementation of the second aspect.

According to a fifth aspect, a network device is provided, configured to perform the system information transmission method described in the first aspect. The network device may include: a memory, and a processor, a transmitter, and a receiver coupled to the memory. The transmitter is configured to send a signal to another wireless communications device, for example, a terminal, the receiver is configured to receive a signal sent by the another wireless communications device, for example, the terminal, the memory is configured to store implementation code of the system information transmission method described in the first aspect, and the processor is configured to execute program code stored in the memory, that is, perform the system information transmission method described in any possible implementation of the first aspect.

According to a sixth aspect, a terminal is provided, configured to perform the system information transmission method described in the second aspect. The terminal may include a memory, and a processor, a transmitter, and a receiver coupled to the memory. The transmitter is configured to send a signal to another wireless communications device, for example, a network device, the receiver is configured to receive a signal sent by the another wireless communications device, for example, the network device, the memory is configured to store implementation code of the system information transmission method described in the second aspect, and the processor is configured to execute program code stored in the memory, that is, perform the system information transmission method described in any possible implementation of the second aspect.

According to a seventh aspect, a communications system is provided. The communications system includes a network device and a terminal. The network device may be the network device described in the first aspect. The terminal may be the terminal described in the second aspect.

According to an eighth aspect, a computer-readable storage medium is provided. The readable storage medium stores instructions, and when the instructions run on a computer, the computer is caused to perform the system information transmission method described in the first aspect.

According to a ninth aspect, another computer-readable storage medium is provided. The readable storage medium stores instructions, and when the instructions run on a computer, the computer is caused to perform the system information transmission method described in the second aspect.

With reference to a tenth aspect, a computer program product including instructions is provided. When the computer program product runs on a computer, the computer is caused to perform the system information transmission method described in the first aspect.

With reference to an eleventh aspect, another computer program product including instructions is provided. When the computer program product runs on a computer the computer is caused to perform the system information transmission method described in the second aspect.

BRIEF DESCRIPTION OF DRAWINGS

To describe the technical solutions in the embodiments of this application or in the background more clearly, the following briefly describes the accompanying drawings for describing the embodiments of this application or the background.

DESCRIPTION OF EMBODIMENTS

Terms used in the implementation parts of this application are merely used to explain specific embodiments of this application, but are not intended to limit this application.

Figure 1A:
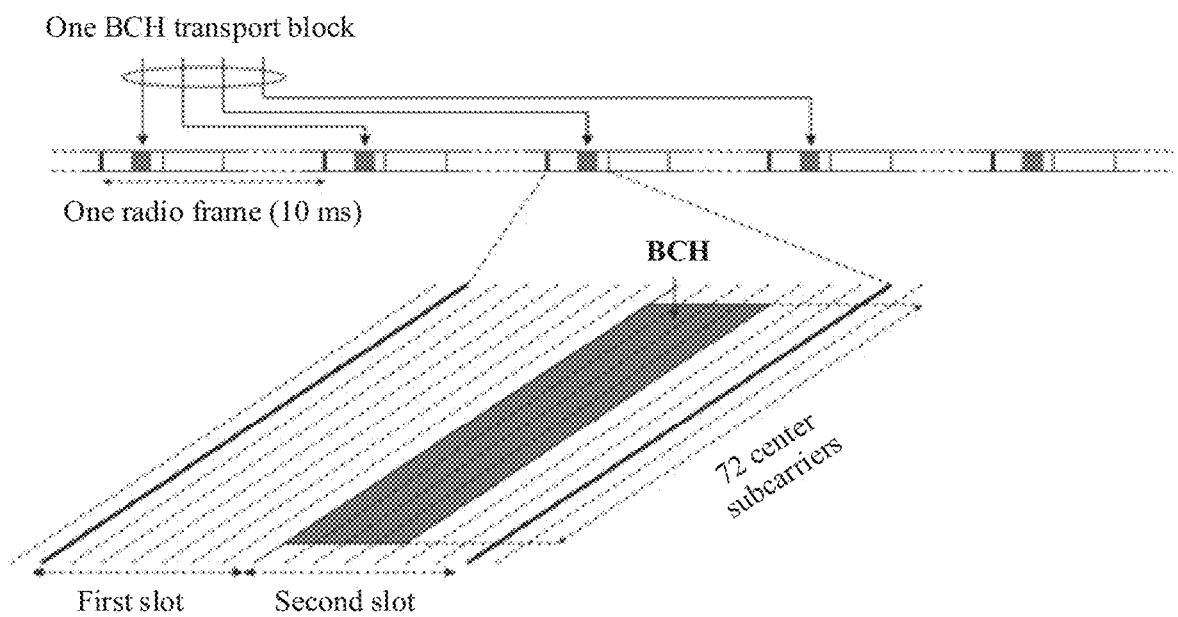
FIG. 1A is a schematic diagram of sending a master information block in LTE.
Figure 1B:
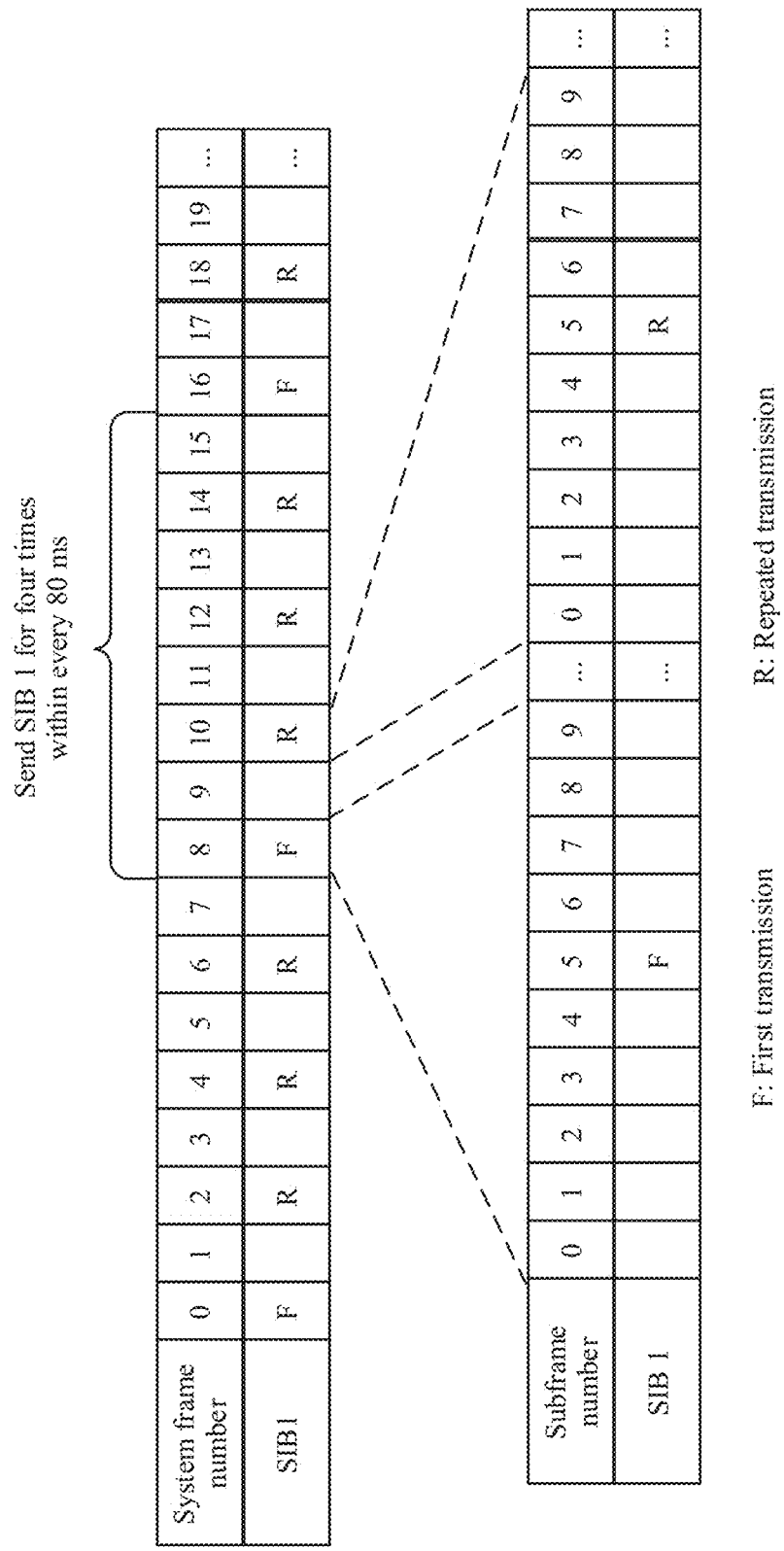
FIG. 1B is a schematic diagram of sending system information block SIB 1 in LTE.
Figure 2:
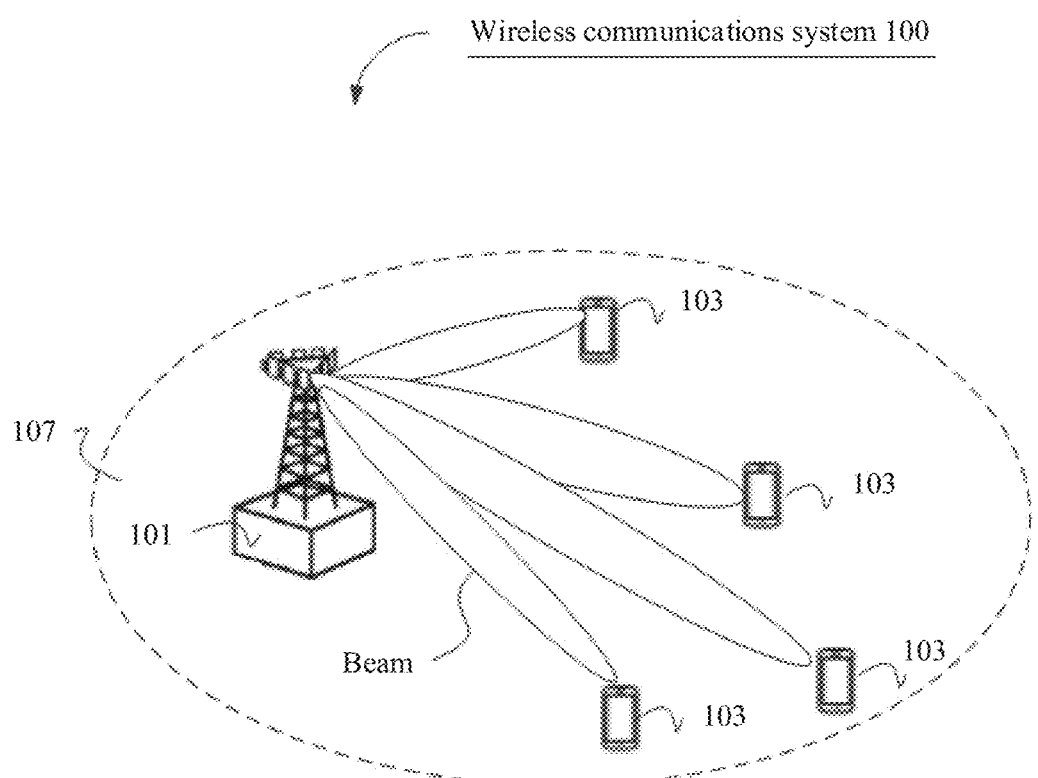
FIG. 2 is a schematic architectural diagram of a wireless communications system according to this application.

FIG. 2 shows a wireless communications system 100 involved in this application. The wireless communications system 100 may work on a high-frequency band, is not limited to a long term evolution (Long Term Evolution, LTE) system, and may also be a future evolved 5th generation mobile communications (the 5th Generation, 5G) system, a new radio (NR) system, a machine to machine (Machine to Machine, M2M) system, or the like. The wireless communications system 100 may work on a licensed band, or may work on an unlicensed band. As shown in FIG. 2, the wireless communications system 100 may include one or more network devices 101, one or more terminals 103, and a core network (not shown).

The network device 101 may be a base station, and the base station may be configured to communicate with the one or more terminals, or may be configured to communicate with one or more base stations having some terminal functions (for example, communication between a macro base station and a micro base station, such as access points). The base station may be a base transceiver station (Base Transceiver Station, BTS) in a time division synchronous code division multiple access (Time Division Synchronous Code Division Multiple Access, TD-SCDMA) system, or may be an evolved base station (Evolved Node B, eNB) in an LTE system, or a base station in a 5G system or a new radio (NR) system. In addition, the base station may alternatively be an access point (Access Point, AP), a transmission reception point (transmission reception point, TRP), a central unit (Central Unit, CU), or another network entity, and may include some or all of functions of the foregoing network entities.

The terminal 103 may be distributed in the entire wireless communications system 100, and may be stationary or mobile. In some embodiments of this application, the terminal 103 may be user equipment (UE), a mobile device, a mobile station (mobile station), a mobile unit (mobile unit), an M2M terminal, a wireless unit, a remote unit, a terminal agent, a mobile client, or the like.

The use of the unlicensed band can improve a system capacity of the wireless communications system 100. In this application, the wireless communications system 100 may be an LTE communications system that can work in an unlicensed band, for example, an LTE-U system, or may be a new radio communications system that can work in an unlicensed band, for example, an NR-U system, or may be another communications system that can work in an unlicensed band in the future.

In addition, the wireless communications system 100 may further include a Wi-Fi network.

Figure 3A:
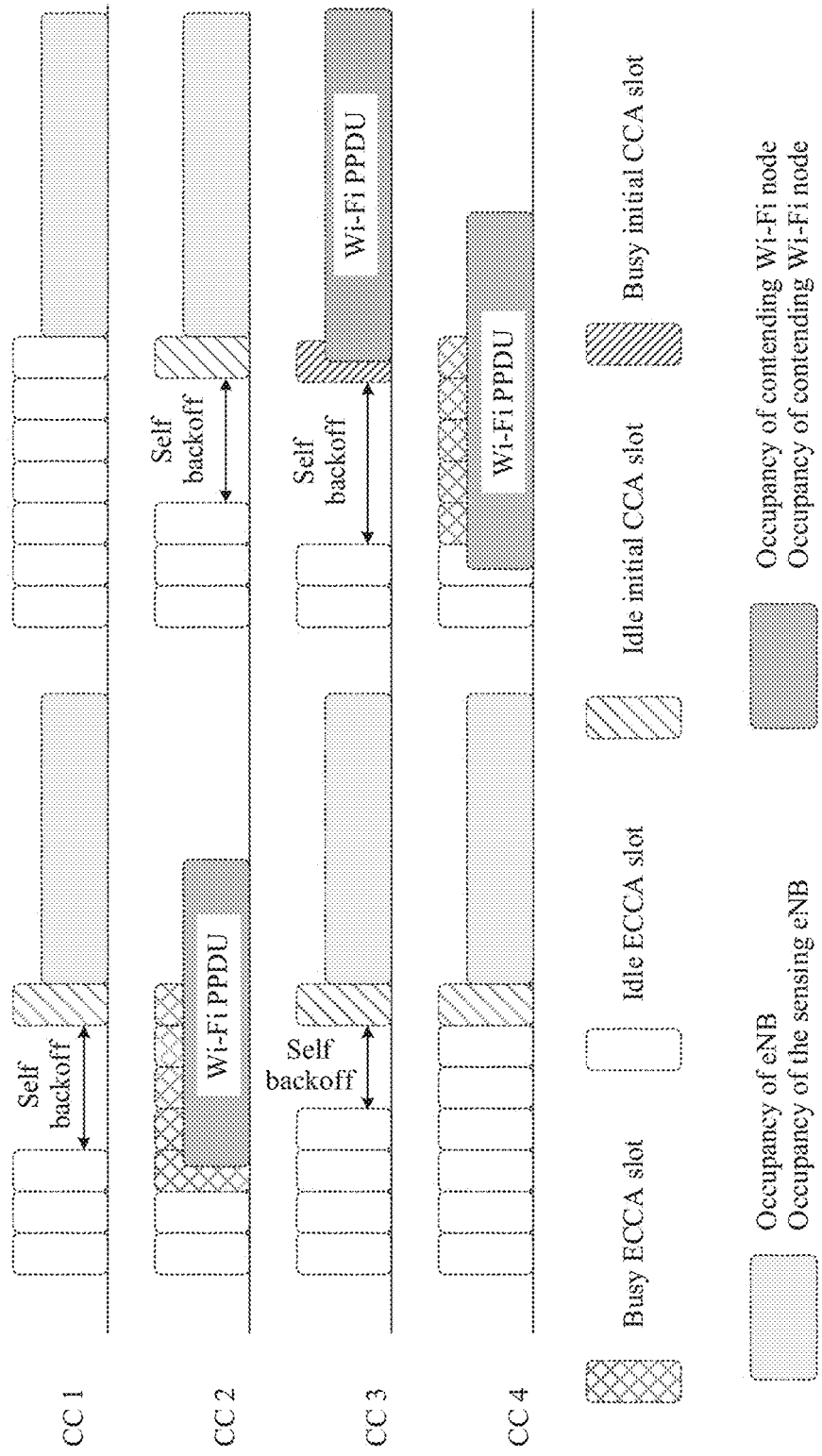
FIG. 3A and FIG. 3B are schematic diagrams of a Type A/Type B multi-carrier LBT mechanism according to this application.
Figure 3B:
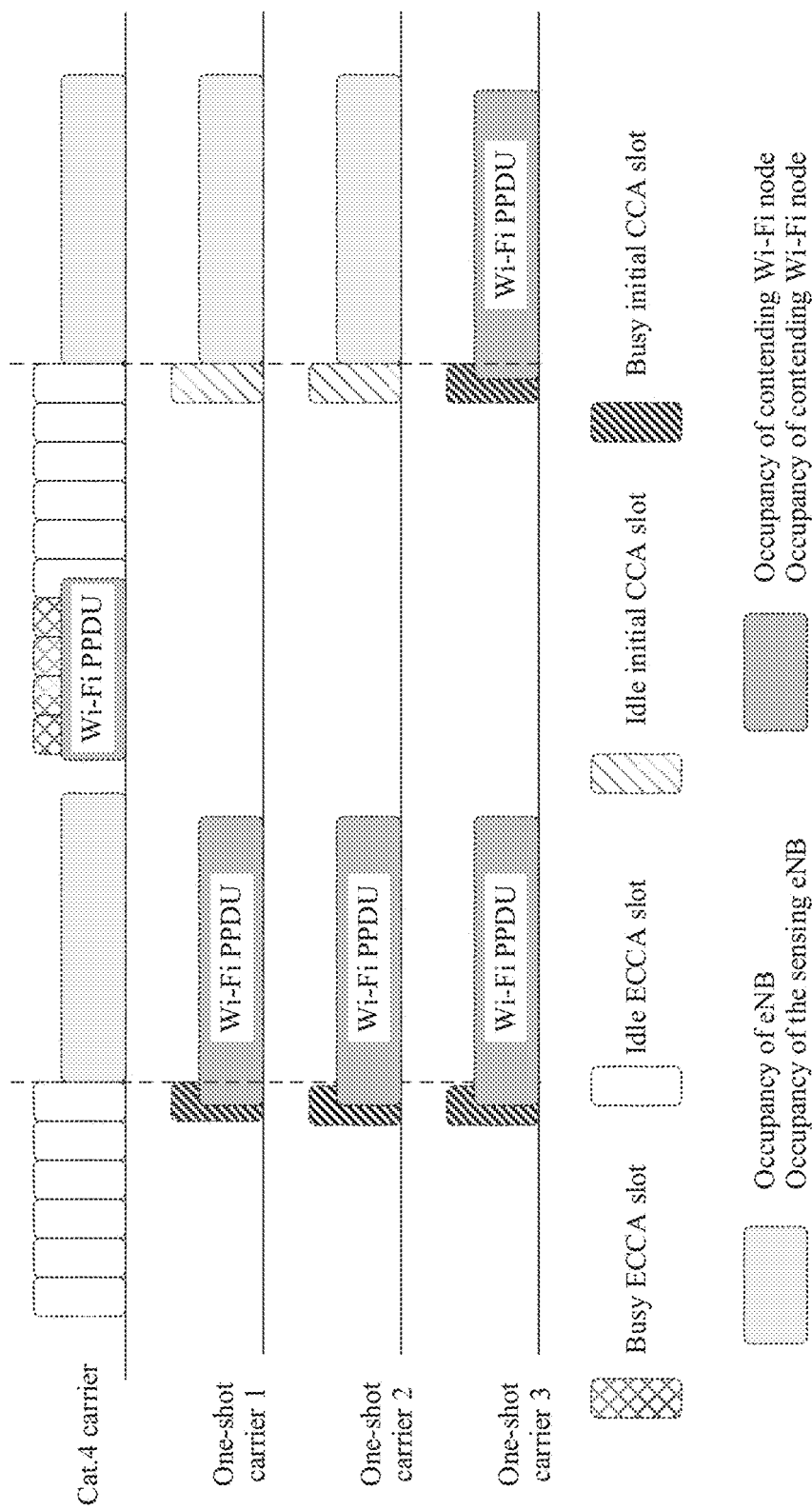

When the wireless communications system 100 works on an unlicensed band, to ensure coexistence with another device that works on the unlicensed band, the NR-U system uses a channel contention access mechanism of LBT, and specifies a procedure and parameters of the LBT in the 3GPP release R13. FIG. 3A and FIG. 3B show two types of listen before talk (LBT) listening mechanisms.

As shown in FIG. 3A, a Type A (Type A) LBT device may perform independent backoff on a plurality of component carriers (component carriers, CCs), to delay transmission when backoff is completed on a carrier to wait for other component carriers that are still backing off. After backoff is completed on all carriers for LBT, the device needs to perform additional one-shot CCA (25 us clear channel assessment) to ensure that all carriers are idle. If all carriers are idle, the eNB performs transmission on the idle carriers simultaneously.

As shown in FIG. 3B, a Type B (Type B) LBT device performs backoff only on a selected component carrier. When backoff ends, lookback of one-shot CCA (25 us clear channel assessment) is performed on other component carriers. If the component carrier is idle, data transmission is performed. If the component carrier is not idle, data transmission cannot be performed on the component carrier this time.

As shown in FIG. 3A and FIG. 3B, a device for performing LBT may be LTE LAA, Wi-Fi, NR-U, or another communications device that works on an unlicensed (unlicensed) band. In the figures, interference received by the device for performing LBT comes from a Wi-Fi system. In an actual scenario, interference received by the device for performing LBT may also come from LTE LAA, NR-U, or another communications system that works on an unlicensed band. This is not limited in this application.

Not limited to FIG. 3A and FIG. 3B, an LBT listening mechanism used by the NR-U system may also change, which does not affect implementation of this application.

In this application, the wireless communications system 100 is a multi-beam communications system.

The network device 101 may be configured with a large-scale antenna array, and the antenna array is controlled by using a beamforming technology to form beams with different directions. To cover an entire cell 107, the network device 101 needs to use a plurality of beams with different directions. The network device 101 may transmit system information (system information, SI) by using the beams with different directions. The system information is very important for an initial access procedure and normal operation of the terminal 103.

In NR, the system information is classified into an MIB, RMSI, and OS. The MIB is carried in a physical broadcast channel PBCH, and the RMSI is carried in an RMSI PDSCH. The OSI is further classified into broadcast OSI (broadcast OSI) and on-demand OSI (on-demand OSI). Like the PBCH and the RMSI, the broadcast OSI is periodically broadcast and sent by the network device 101, and configuration information of the broadcast OSI is carried in the RMSI. Periodically sending system information increases system overheads and reduces resource utilization. For a multi-beam system, system information needs to be repeatedly sent in all beam directions, to further increase system overheads.

To improve system efficiency, for the on-demand OSI, the network device 101 does not send the on-demand OS if not receiving a request from the terminal 103. The terminal 103 may request the network device 101 to send some on-demand OSI, or may request the network device 101 to send all on-demand OSI (the on-demand OSI includes one or more SIBs). An on-demand OSI request may be based on an existing random access procedure, and the terminal 103 may request specific OS from the gNB by using a message 1 (Msg1) or a message 3 (Msg3) in a four-step random access procedure (namely, a contention-based random access procedure).

However, after the network device 101 receives a request for sending all or some on-demand OSI, the all or some on-demand OSI becomes broadcast OSI, and is periodically broadcast and sent by the network device 101 repeatedly in all beam directions. This manner of sending the on-demand OSI still causes relatively high system overheads. In addition, it can be learned from the foregoing procedure of requesting the on-demand OSI by the UE that, requesting the system information occupies a physical random access channel (physical random access channel, PRACH) resource.

Especially, when a lot of UEs send on-demand OS requests, other UEs may fail to complete the initial access procedure.

To avoid this situation, in the conventional technology, the network device 101 carries a sending state of the on-demand OSI in the RMSI. For example, if the on-demand OSI includes eight different SIBs, 8-bit indication information is added to the RMSI, where each bit corresponds to one SIB, to indicate whether the SIB has been sent. Before requesting the on-demand OSI, the terminal checks the sending state of the on-demand OSI in the RMSI. If the required SIB has been sent, the terminal 103 does not send the on-demand OSI request.

However, after the network device 101 receives the request for sending on-demand OSI, the network device 101 repeatedly sends the on-demand OSI in all beam directions. When a quantity of beams is relatively large, even if there are a small quantity of terminals that require the system information or the on-demand OSI corresponds to only several beam directions, the on-demand OSI still needs to be sent in all beam directions. This wastes a large quantity of system resources.

To resolve the existing technical problem, this application provides a system information transmission method, to reduce system overheads.

A main inventive idea of this application may include: For an on-demand OS request sent by a specific terminal, a network device transmits OSI by using only some base station transmitted beams, instead of using all base station transmitted beams. In this way, system overheads can be reduced. Once the network device receives an on-demand OSI request for requesting one or more pieces of OSI, the one or more pieces of OSIs are periodically sent by the network device.

In addition, the network device may further indicate a case in which a base station transmitted beam carries on-demand OSI, that is, indicate which pieces of on-demand OSI are carried or not carried in different base station transmitted beams. In this way, the terminal may determine, based on an indication of the network device, whether the on-demand OSI carried in the beam in which the terminal is located has been sent. If the on-demand OSI has been sent, the terminal only needs to detect OSI at a time location that corresponds to the beam in which the terminal is located and that is used to transmit OSI, and no longer sends the on-demand OSI request to the network device. In this way, the terminal in a cell can be prevented from repeatedly requesting OSI available in the cell (OSI available in the cell), thereby reducing system overheads.

The technical solutions provided in this application may be further applicable to other SI, for example, RMSI, not limited to the on-demand OSI.

In this application, indicating a base station transmitted beam may be equivalent to indicating a downlink signal block, for example, an SS/PBCH block or a CSI-RS resource, transmitted in the beam direction. In this application, a signal sent on the base station transmitted beam may be referred to as a downlink signal block. Indicating SI carried in a base station transmitted beam may be equivalent to indicating SI having a quasi co-location QCL (QCL, Quasi co-location) relationship with a downlink signal block transmitted in a direction of the base station transmitted beam. For example, SI carried in base station transmitted beam 1 is SI having a quasi co-location with SS/PBCH block 1 transmitted in the beam 1 direction.

In this application, the quasi co-location QCL represents whether configuration parameters of two signals are the same. For example, having a QCL means that one or more of Doppler frequency shift, Doppler dispersion, average delay, delay expansion, and spatial reception parameters are the same.

Figure 4A:
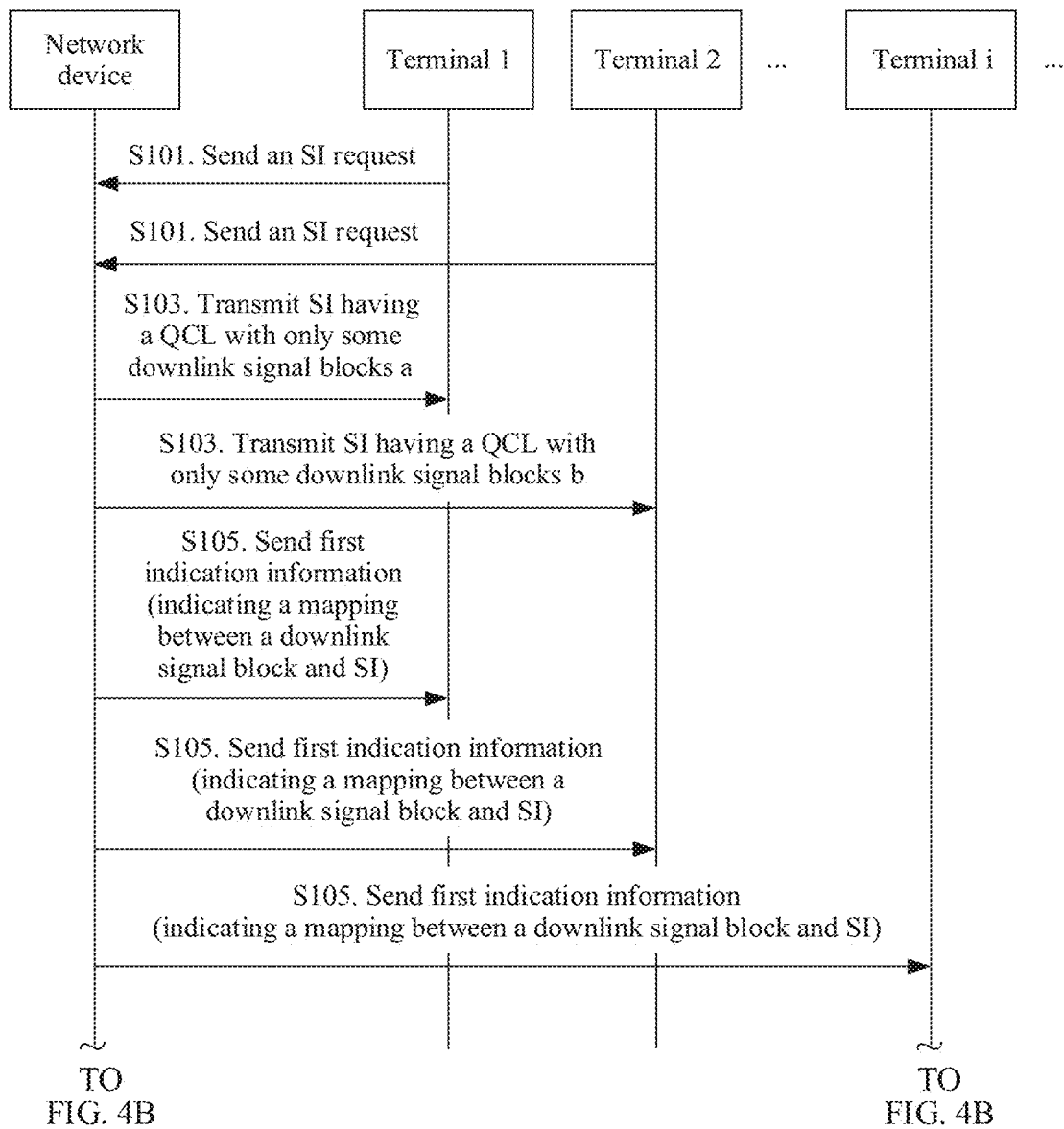
FIG. 4A and FIG. 4B are an overall schematic flowchart of a system information transmission method according to this application.
Figure 4B:
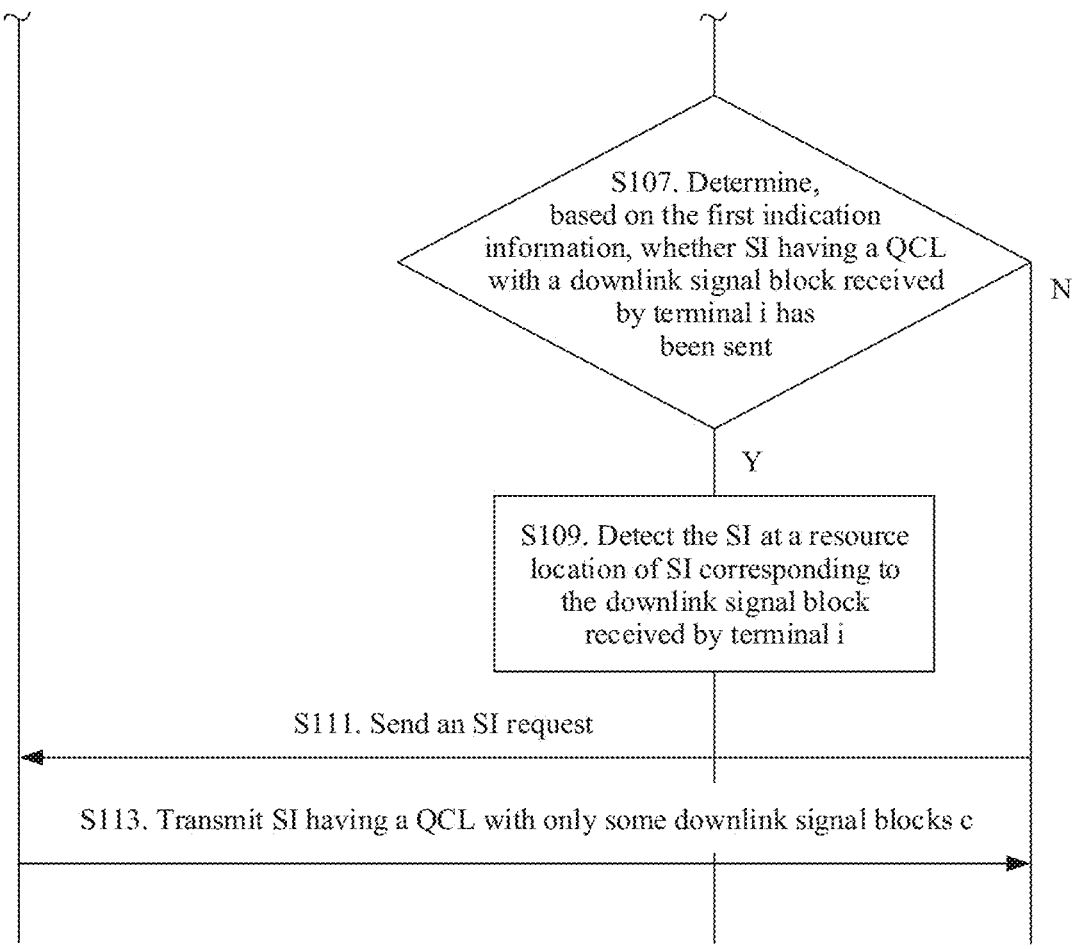

The following describes an overall procedure of the technical solutions provided in this application with reference to FIG. 4A and FIG. 4B. As shown in FIG. 4A and FIG. 4B, a cell includes a plurality of terminals, such as terminal 1, terminal 2, . . . , and terminal i, where i is a positive integer. The following shows the details.

S101. A network device receives an SI request sent by one or more terminals.

Specifically, as shown in FIG. 4A and FIG. 4B, the network device receives SI requests sent by terminal 1 and terminal 2. Not limited to FIG. 4A and FIG. 4B, the network device may further receive SI requests sent by more terminals, or receive an SI request sent by only one terminal.

Optionally, the SI request may carry indication information of SI, used to indicate which SI or which pieces of SI the terminal requests. SI requested by different terminals may be the same or different. This is not limited in this application. Optionally, the SI request may request all SI. In this case, the SI request does not need to carry indication information of SI.

Specifically, the SI request may be a message 1 (msg1) or a message 3 (msg3) in a random access procedure, or may be independent signaling. This is not limited in this application.

S103. The network device transmits SI, where for a specific terminal, the SI transmitted by the network device has a QCL with only a portion of downlink signal blocks. Correspondingly, the specific terminal may receive SI that has a QCL with only a portion of downlink signal blocks and that is transmitted by the network device.

In this application, for a specific terminal, that the SI transmitted by the network device has a QCL with only a portion of downlink signal blocks means that for the specific terminal, the network device transmits the SI only in a direction of beams carrying the portion of downlink signal blocks. The specific terminal is located in coverage of the beams carrying the portion of downlink signal blocks, and can detect the SI transmitted by the network device in the beam direction.

As shown in FIG. 4A and FIG. 4B, for terminal 1, the SI transmitted by the network device has a QCL with only a portion of downlink signal blocks a. In other words, the network device transmits the SI requested by terminal 1 only in a beam direction in which the portion of downlink signal blocks a are transmitted, instead of transmitting the SI requested by terminal 1 on all base station transmitted beams. To be specific, the network device may directionally transmit the SI requested by terminal 1 to terminal 1, instead of broadcasting the SI requested by terminal 1 by using all base station transmitted beams. In this way, system overheads can be effectively reduced. Herein, the portion of downlink signal blocks a may be one or more downlink signal blocks.

As shown in FIG. 4A and FIG. 4B, for terminal 2, the SI transmitted by the network device has a QCL with only a portion of downlink signal blocks b. In other words, the network device transmits the SI requested by terminal 2 only in a beam direction in which the portion of downlink signal blocks b are transmitted, instead of transmitting the SI requested by terminal 2 by using all base station transmitted beams. To be specific, the network device may directionally transmit the SI requested by terminal 2 to terminal 2, instead of broadcasting the SI requested by terminal 2 by using all base station transmitted beams. In this way, system overheads can be effectively reduced. Herein, the portion of downlink signal blocks b may be one or more downlink signal blocks.

It may be inferred that when a relatively large quantity of terminals request SI from the network device, and the plurality of terminals are distributed in coverage of each base station transmitted beam, the network device may need to transmit SI by using all base station transmitted beams. However, for a specific terminal (for example, terminal 1), the network device transmits SI requested by the specific terminal only in a direction of some base station transmitted beams.

In this application, the portion of downlink signal blocks are a subset of all downlink signal blocks transmitted by the network device. Specifically, if the portion of downlink signal blocks transmitted by the network device have a QCL, the all downlink signal blocks refer to all downlink signal blocks that are transmitted by the network device and that do not have a QCL. For example, all SS/PBCHs transmitted by the network device are all SS/PBCHs that are transmitted by the network device and that do not have a QCL. For another example, all CSI-RSs transmitted by the network device refer to all CSI-RSs that are transmitted by the network device and that do not have a QCL.

S105. The network device sends first indication information.

Specifically, the network device may broadcast or multicast the first indication information. The first indication information may indicate a mapping between a downlink signal block and SI, and the downlink signal block has a QCL with the SI corresponding to the downlink signal block.

In this application, the SI corresponding to the downlink signal block is SI transmitted by the network device in a beam direction in which the downlink signal block is transmitted. In other words, the first indication information may indicate a case in which different base station transmitted beams carry SI, that is, indicate which pieces of SI are carried or not carried in different base station transmitted beams. Specific implementation of the first indication information is described in detail in subsequent embodiments, and details are not described herein again.

S107. The terminal determines, based on the first indication information, whether SI that has a QCL with the received downlink signal block and that needs to be obtained has been sent, and if the SI has been sent, performs S109; otherwise, performs S111. Herein, the SI that has a QCL with the received downlink signal block and that needs to be obtained is SI that the terminal intends to receive. In other words, in the mapping indicated by the first indication information, if the SI corresponding to the downlink signal block received by the terminal includes the SI that the terminal intends to receive, S109 is performed; otherwise, S11 is performed.

S109. The terminal may detect SI at a resource location that corresponds to the downlink signal block received by the terminal and that is used to transmit SI, and no longer need to request the SI from the network device.

S111. The terminal may send an SI request to the network device. Correspondingly, as shown in S113, the network device may transmit SI having a QCL with only a portion of downlink signal blocks.

Terminal i in FIG. 4A and FIG. 4B may be a terminal different from terminal 1 (or terminal 2), or may be terminal 1 (or terminal 2). Terminal i and terminal 1 (or terminal 2) may be located on a same beam, or may be located on different beams. Herein, a beam in which a terminal is located is a beam pointing to the terminal or a beam with coverage in which the terminal is located, that is, a beam in which the terminal can detect a signal carried in the terminal.

It can be learned from S107 to S113 that, if a beam in which terminal i is located is the same as a beam in which terminal 1 (or terminal 2) is located, terminal i no longer needs to request, from the network device, SI that has been requested by terminal 1 (or terminal 2). Because the network device periodically transmits, in a beam direction pointing to terminal 1 (or terminal 2), the SI that has been requested by terminal 1 (or terminal 2), terminal i can detect the SI at a resource location that corresponds to the beam and that is used to transmit SI (that is, a resource location that corresponds to a downlink signal block received by terminal i and that is used to transmit SI). In this way, the terminal in a cell can be prevented from repeatedly requesting OSI available in the cell, thereby reducing system overheads.

Herein, that the beam in which terminal i is located is the same as the beam in which terminal 1 (or terminal 2) is located means that the downlink signal block received by terminal i and the downlink signal block received by terminal 1 (or terminal 2) have a QCL.

Not limited to FIG. 4A and FIG. 4B, there is no time sequence limitation between transmitting the SI by the network device and sending the first indication information by the network device. To be specific, S103 may be earlier than S105, S103 may be later than S105, and S103 and S105 may also occur simultaneously.

According to the technical solution shown in FIG. 4A and FIG. 4B, for an SI request sent by a specific terminal, the network device transmits SI by using only some base station transmitted beams, instead of using all base station transmitted beams. This can reduce system overheads. In addition, based on an indication of the network device, the terminal no longer needs to request, from the network device, SI requested by another terminal or the terminal itself, and only needs to detect the SI at a resource location that corresponds to a downlink signal block received by the terminal and that is used to transmit SI. In this way, the terminal in a cell can be prevented from repeatedly requesting SI available in the cell, thereby reducing system overheads.

The technical solutions provided in this application are further described below in detail with reference to the embodiments in FIG. 5 to FIG. 11 by using an example in which the downlink signal block is a synchronization signal/physical broadcast channel block (synchronization signal/physical broadcast channel block. SS/PBCH block).

(1) The Network Device Transmits SI.

Figure 5:
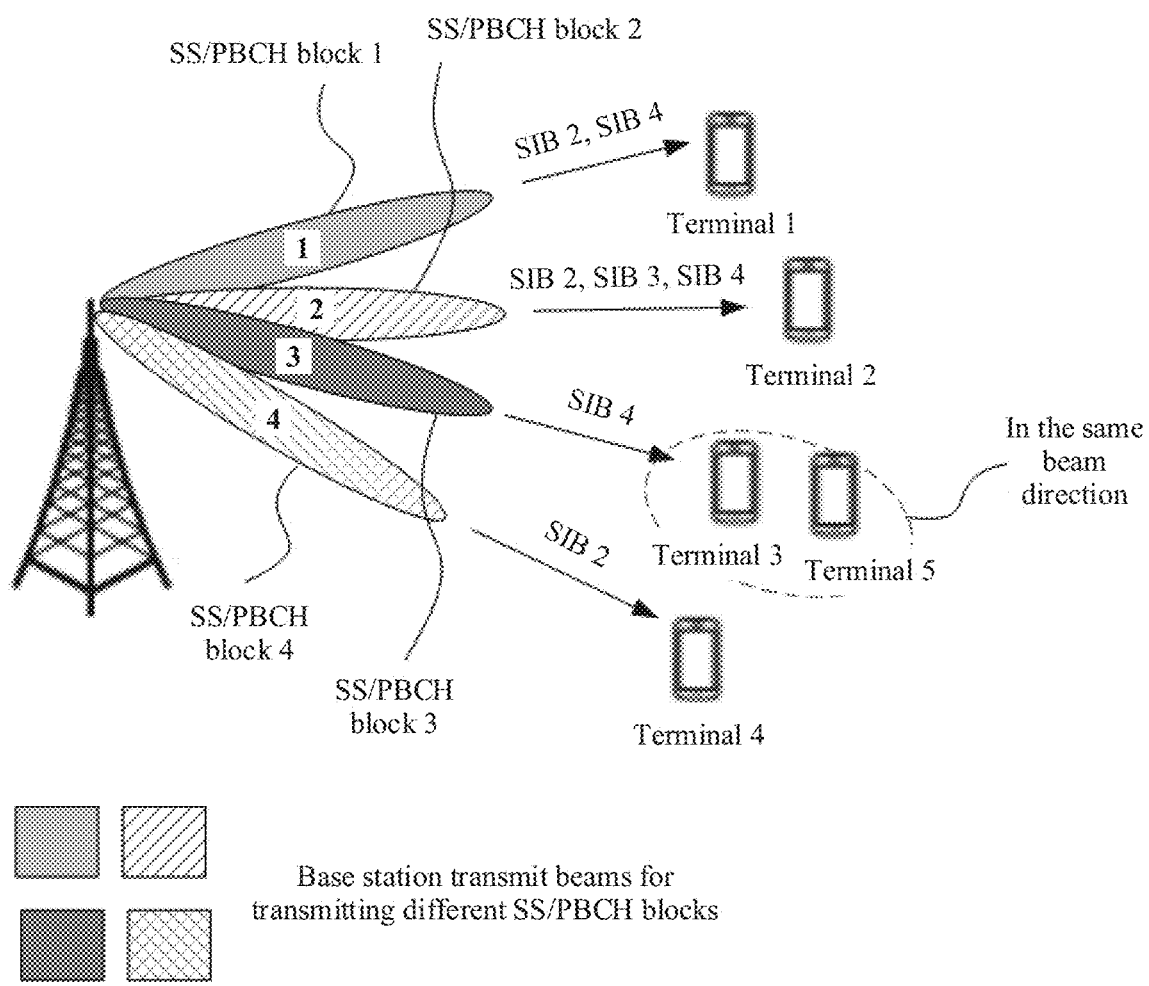
FIG. 5 is a schematic diagram of directional transmission of SI by a gNB according to this application.

FIG. 5 shows an example of a solution in which the network device transmits SI for a specific terminal by using only some base station transmitted beams.

As shown in FIG. 5, the network device is a base station gNB. It is assumed that a beam (beam 1) for transmitting SS/PBCH block 1 points to terminal 1, a beam (beam 2) for transmitting SS/PBCH block 2 points to terminal 2, a beam (beam 3) for transmitting SS/PBCH block 3 points to terminal 3, and a beam (beam 4) for transmitting SS/PBCH block 4 points to terminal 4.

The gNB transmits SI based on received SI requests sent by terminals 1 to 4. Terminal 1 sends an SI request to the gNB to request to obtain SIB 2 and SIB 4; terminal 2 sends an SI request to the gNB to request to obtain SIB 2, SIB 3, and SIB 4; terminal 3 sends an SI request to the gNB to request to obtain SIB 4; and terminal 4 sends an SI request to the gNB to request to obtain SIB 2.

Specifically, for terminal 1, the gNB only transmits SI having a QCL with SS/PBCH block 1. In other words, the gNB transmits SIB 2 and SIB 4 only in a beam (beam 1) direction in which SS/PBCH block 1 is transmitted.

Specifically, for terminal 2, the gNB only transmits SI having a QCL with SS/PBCH block 2. In other words, the gNB transmits SIB 2, SIB 3, and SIB 4 only in a beam (beam 2) direction in which SS/PBCH block 2 is transmitted.

Specifically, for terminal 3, the gNB only transmits SI having a QCL with SS/PBCH block 3. In other words, the gNB transmits SIB 4 only in a beam (beam 3) direction in which SS/PBCH block 3 is transmitted.

Specifically, for terminal 4, the gNB only transmits SI having a QCL with SS/PBCH block 4. In other words, the gNB transmits SIB 2 only in a beam (beam 4) direction in which SS/PBCH block 4 is transmitted.

It can be learned that, for a specific terminal, the network device only transmits SI having a QCL with a portion of downlink signal blocks. In this application, the network device may determine the portion of downlink signal blocks in, but not limited to, the following manners:

Manner 1: A downlink signal block having a QCL with an SI request received by the network device. In other words, for the specific terminal, some base station transmitted beams used by the network device to transmit SI may include: a base station transmitted beam having a QCL with a base station received beam used by the network device to receive the SI request, or further include P (P is a positive integer) adjacent beams of the base station transmitted beam.

Manner 2: A downlink signal block having a QCL with an SI request transmitted by the terminal. In other words, for the specific terminal, some base station transmitted beams used by the network device to transmit SI may include: a base station transmitted beam having a QCL with a terminal transmitted beam used by the terminal to transmit the SI request, or further include Q (Q is a positive integer) adjacent beams of the base station transmitted beam.

Manner 3: A downlink signal block indicated by the terminal. In other words, the terminal may indicate, to the network device, which base station transmitted beam or which base station transmitted beams are used to transmit SI.

Manner 4: A downlink signal block configured by a system. In other words, the system may configure some base station transmitted beams used by the network device to transmit SI. Optionally, in a scenario in which the terminal is stationary or a movement range of the terminal is very limited, the system may configure, for the terminal, some base station transmitted beams for transmitting SI.

It can be learned that, for a specific terminal, the network device sends SI only in a beam direction in which the network device receives the SI request, or in the beam direction and some adjacent beam directions, or in a beam direction in which the terminal sends the SI request, or in the beam direction and some adjacent beam directions, or in a beam direction configured by the system, or in a beam direction requested by the terminal, to greatly reduce system overheads required for sending the SI, and improve system efficiency.

Figure 6:
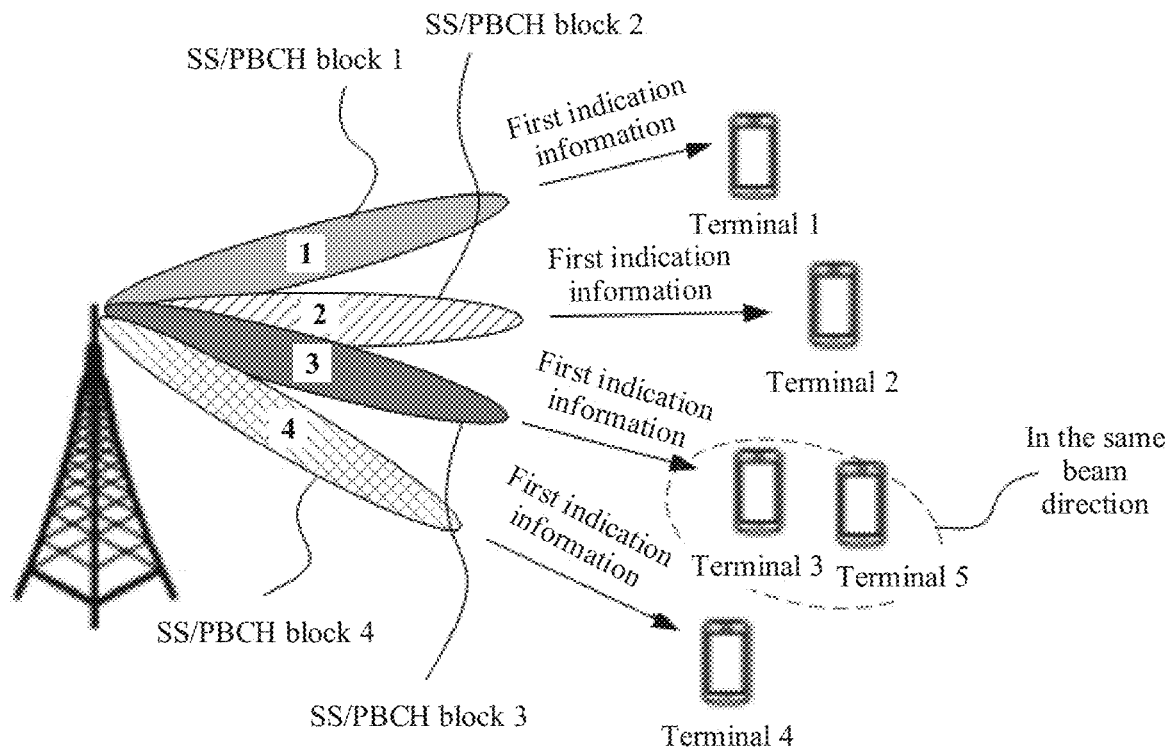
FIG. 6 is a schematic diagram of broadcasting first indication information by a gNB according to this application.
Figure 6:
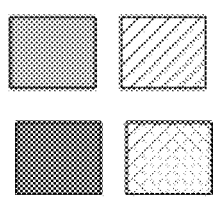

(2) The Network Device Sends (Broadcasts or Multicasts) First Indication Information Based on the embodiment in FIG. 5, FIG. 6 shows an example of a solution in which the network device sends the first indication information.

As shown in FIG. 6, the gNB broadcasts the first indication information. The broadcast herein means that the first indication information is transmitted by using all base station transmitted beams. All terminals in a cell can receive the first indication information. The first indication information may indicate the mapping shown in Table 1.

TABLE 1

| Beam | Downlink signal block | SI |
| --- | --- | --- |
| Beam 1 | SS/PBCH block 1 | SIB 2, SIB 4 |
| Beam 2 | SS/PBCH block 2 | SIB 2, SIB 3, SIB 4 |
| Beam 3 | SS/PBCH block 3 | SIB 4 |
| Beam 4 | SS/PBCH block 4 | SIB 2 |

In the mapping shown in the example in Table 1, there is a QCL between the downlink signal blocks SS/PBCH blocks and SI corresponding to the downlink signal blocks SS/PBCH blocks, indicating that the gNB transmits the SI corresponding to the SS/PBCH blocks in beam directions in which the SS/PBCH blocks are transmitted. In other words, there is also a correspondence between the SI corresponding to the SS/PBCH blocks and beams for transmitting the SS/PBCH blocks.

In this application, the terminal in the cell may first determine, based on the first indication information, whether SI that has a QCL with the downlink signal block received by the terminal and that the terminal intends to obtain has been sent. If the SI has been sent, the terminal may detect the SI at a time location that corresponds to the downlink signal block received by the terminal and that is used to receive SI, and does not need to send an SI request to the gNB.

For example, as shown in FIG. 6, terminal 5 and terminal 3 are located on a same beam, and the beam is a beam used by the gNB to transmit SS/PBCH block 3. It can be learned from the first indication information shown in the example in Table 1 that SIB 4 having a QCL with SS/PBCH block 3 has been sent. To be specific, SIB 4 is periodically transmitted by the gNB in a beam direction in which SS/PBCH block 3 is transmitted. In this way, terminal 5 may detect SIB 4, and no longer needs to send an SI request to the gNB, thereby reducing system overheads.

Optionally, when the SI is specifically on-demand OSI, the first indication information may be carried in one or more of the following: remaining minimum system information RMSI and an SS/PBCH block. This is not limited thereto, and the first indication information may alternatively be carried in independent signaling.

(3) Specific Implementation of the First Indication Information

Figure 7A:
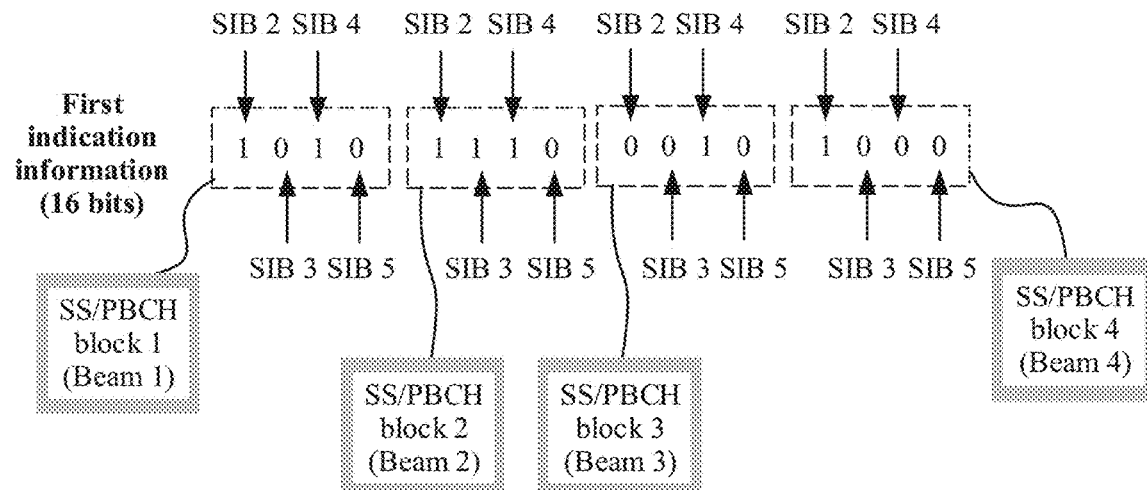
FIG. 7A and FIG. 7B are schematic diagrams of two implementations of first indication information according to this application.
Figure 7B:
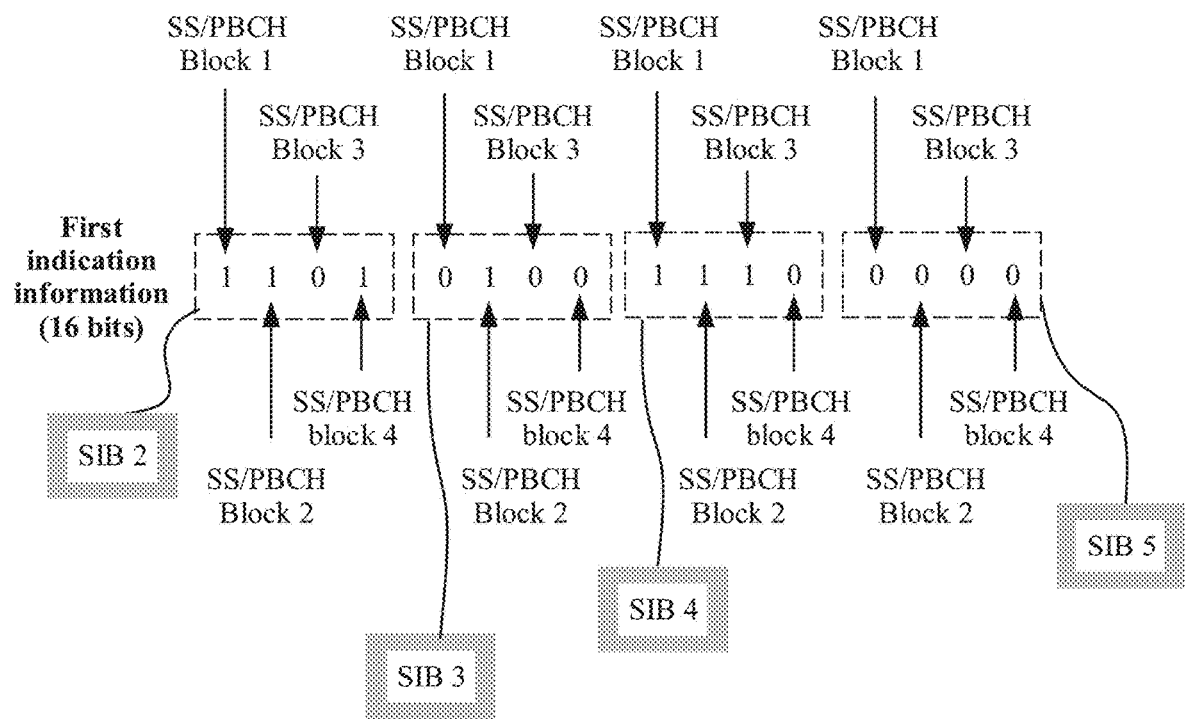

Based on the embodiments in FIG. 5 to FIG. 6. FIG. 7A and FIG. 7B show examples of two main implementations of the first indication information.

1. Implementation 1

As shown in FIG. 7A, the first indication information may be 16-bit indication information, the 16 bits are divided into four groups of bits, and one group of bits corresponds to one SS/PBCH block, indicating a transmission status of SI corresponding to the SS/PBCH block. Each group of bits includes four bits, and one bit corresponds to one piece of SI, indicating whether the SI is transmitted by the gNB.

It is assumed that the first to fourth groups of bits respectively correspond to SS/PBCH blocks 1 to 4, and the first to fourth bits in each group of bits respectively correspond to SIB 2 to SIB 5. As shown in FIG. 7A:

The first group of bits is "1010", indicating that SIB 2 and SIB 4 corresponding to SS/PBCH block 1 have been transmitted by the gNB, and SIB 3 and SIB 5 corresponding to SS/PBCH block 1 have not been transmitted by the gNB. In other words, the gNB transmits SIB 2 and SIB 4 in a beam direction in which SS/PBCH block 1 is transmitted, but does not transmit SIB 3 and SIB 5. For details, refer to FIG. 5.

The second group of bits is "1110", indicating that SIB 2, SIB 3, and SIB 4 corresponding to SS/PBCH block 2 have been transmitted by the gNB, and SIB 5 corresponding to SS/PBCH block 2 has not been transmitted by the gNB. In other words, the gNB transmits SIB 2, SIB 3, and SIB 4 in a beam direction in which SS/PBCH block 2 is transmitted, but does not transmit SIB 5. For details, refer to FIG. 5.

The third group of bits is "0010", indicating that SIB 4 corresponding to SS/PBCH block 3 has been transmitted by the gNB, and SIB 2, SIB 3, and SIB 5 corresponding to SS/PBCH block 3 have not been transmitted by the gNB. In other words, the gNB transmits SIB 4 in a beam direction in which SS/PBCH block 3 is transmitted, but does not transmit SIB 2, SIB 3, and SIB 5. For details, refer to FIG. 5.

The fourth group of bits is "1000", indicating that SIB 2 corresponding to SS/PBCH block 4 has been transmitted by the gNB, and SIB 3, SIB 4, and SIB 5 corresponding to SS/PBCH block 4 have not been transmitted by the gNB. In other words, the gNB transmits SIB 2 in a beam direction in which SS/PBCH block 4 is transmitted, but does not transmit SIB 3, SIB 4, and SIB 5. For details, refer to FIG. 5.

Referring to the embodiment in FIG. 7A, generally, the first indication information may include H groups of bits, each group of bits includes M bits, one bit corresponds to one piece of SI, and a $j^{th}$ piece of bit in an $i^{th}$ group of bits indicates whether $j^{th}$ piece of SI corresponding to an $i^{th}$ downlink signal block has been sent. H is a positive integer, M is a positive integer, $i \in (1, H)$, $j \in (1, M)$, i is a positive integer, and j is a positive integer.

Optionally, when a value of the $j^{th}$ piece of bit in the $i^{th}$ group of bits is '1', it may indicate that the $j^{th}$ piece of SI corresponding to the $i^{th}$ downlink signal block has been sent by the gNB. When the value of the $j^{th}$ piece of bit in the $i^{th}$ group of bits is '0', it may indicate that the $j^{th}$ piece of SI corresponding to the $i^{th}$ downlink signal block has not been sent by the gNB. This is not limited thereto, and it may also be specified that the bit value '0' indicates that the corresponding SI has been sent by the gNB, and the bit value '1' indicates that the corresponding SI has not been sent by the gNB. In actual application, a plurality of bits may alternatively be used to correspond to one piece of SI.

2. Implementation 2

As shown in FIG. 7B, the first indication information may be 16-bit indication information, the 16 bits are divided into four groups of bits, and one group of bits corresponds to one piece of SI, indicating transmission statuses of SI corresponding to different SS/PBCH blocks. Each group of bits includes four bits, and one bit corresponds to one SS/PBCH block, indicating whether SI corresponding to the SS/PBCH block is transmitted by the gNB.

It is assumed that the first to fourth groups of bits respectively correspond to SIB 2 to SIB 5, and the first to fourth bits in each group of bits respectively correspond to SS/PBCH blocks 1 to 4. As shown in FIG. 7B:

The first group of bits is "1101", indicating that SIB 2 corresponding to SS/PBCH block 1, SS/PBCH block 2, and SS/PBCH block 4 has been transmitted by the gNB, and SIB 2 corresponding to SS/PBCH block 3 has not been transmitted by the gNB. In other words, the gNB transmits SIB 2 in beam directions in which SS/PBCH block 1, SS/PBCH block 2, and SS/PBCH block 4 are transmitted, but does not transmit SIB 2 in a beam direction in which SS/PBCH block 3 is transmitted. For details, refer to FIG. 5.

The second group of bits is "0100", indicating that SIB 3 corresponding to SS/PBCH block 2 has been transmitted by the gNB, and SIB 3 corresponding to SS/PBCH block 1, SIB 3 corresponding to SS/PBCH block 3, and SIB 3 corresponding to SS/PBCH block 4 have not been transmitted by the gNB. In other words, the gNB transmits SIB 2 in a beam direction in which SS/PBCH block 2 is transmitted, but does not transmit SIB 3 in beam directions in which SS/PBCH block 1, SS/PBCH block 3, and SS/PBCH block 4 are transmitted. For details, refer to FIG. 5.

The third group of bits is "1110", indicating that SIB 4 corresponding to SS/PBCH block 1, SIB 4 corresponding to SS/PBCH block 2, and SIB 4 corresponding to SS/PBCH block 3 have been transmitted by the gNB, and SIB 4 corresponding to SS/PBCH block 4 has not been transmitted by the gNB. In other words, the gNB transmits SIB 4 in beam directions in which SS/PBCH block 1, SS/PBCH block 2, and SS/PBCH block 3 are transmitted, but does not transmit SIB 4 in a beam direction in which the SS/PBCH block 4 is transmitted. For details, refer to FIG. 5.

The fourth group of bits is "0000", indicating that none of SIB 5 corresponding to SS/PBCH block 1, SIB 5 corresponding to SS/PBCH block 2, SIB 5 corresponding to SS/PBCH block 3, and SIB 5 corresponding to SS/PBCH block 4 is transmitted by the gNB. In other words, the gNB does not transmit SIB 5 in beam directions in which SS/PBCH block 1, SS/PBCH block 2. SS/PBCH block 3, and SS/PBCH block 4 are transmitted. For details, refer to FIG. 5.

Referring to the embodiment in FIG. 7B, generally, the first indication information may include: W groups of bits, one group of bits corresponds to one piece of SI, each group of bits includes Y bits, and one bit corresponds to one downlink signal block. An $n^{th}$ bit in an $m^{th}$ group of bits indicates whether $m^{th}$ piece of SI corresponding to an $n^{th}$ downlink signal block has been sent. W is a positive integer, Y is a positive integer, $m \in (1, W)$, $n \in (1, Y)$, m is a positive integer, and n is a positive integer.

Optionally, when a value of the n"bit in the m" group of bits is '1', it may indicate that the $m^{th}$ SI corresponding to the $n^{th}$ downlink signal block has been sent by the gNB. When the value of the $n^{th}$ bit in the $m^{th}$ group of bits is '0', it may indicate that the m SI corresponding to the $n^{th}$ downlink signal block has not been sent by the gNB. This is not limited thereto, and it may also be specified that the bit value '0' indicates that the corresponding SI has been sent by the gNB, and the bit value '1' indicates that the corresponding SI has not been sent by the gNB. In actual application, a plurality of bits may alternatively be used to correspond to one downlink signal block.

Referring to the embodiments in FIG. 7A and FIG. 7B, it may be inferred that when there are a relatively large quantity of downlink signal blocks or a relatively large amount of SI, a large quantity of bits are required for the implementation of the first indication information shown in the examples in FIG. 7A and FIG. 7B. For example, when the gNB transmits eight SS/PBCH blocks, and each SS/PBCH block corresponds to eight pieces of SI, the first indication information needs 64 (64=8*8) bits. In this case, signaling overheads required by the first indication information are relatively large.

Further, to reduce signaling overheads required by the first indication information, the first indication information may use, but not limited to, the following several implementations:

(1) Manner 1: For a plurality of downlink signal blocks (for example, SS/PBCH blocks) having a QCL, the first indication information may indicate a transmission status of SI corresponding to only one downlink signal block. For example, if the network device transmits eight SS/PBCH blocks, where SS/PBCH block 1 and SS/PBCH block 2 have a QCL, and SS/PBCH block 3 and SS/PBCH block 4 have a QCL. SS/PBCH block 5 and SS/PBCH block 6 have a QCL, and SS/PBCH block 7 and SS/PBCH block 8 have a QCL, the first indication information only needs to indicate sending statuses of SI corresponding to SS/PBCH blocks 1, 3, 5, and 7, or only needs to indicate sending statuses of SI corresponding to SS/PBCH blocks 2, 4, 6, and 8.

In other words, the first indication information may indicate a mapping between only one of a plurality of downlink signal blocks and SI. The plurality of downlink signal blocks have a QCL. Transmission statuses of SI corresponding to the downlink signal blocks having the QCL are the same.

For example, it is assumed that the gNB transmits four SS/PBCH blocks, and the four SS/PBCH blocks all correspond to eight pieces of SI, SIB 1 to SIB 8 in total. It can be learned from FIG. 7A or FIG. 7B that the first indication information requires a total of 32 (32=4*8) bits. If SS/PBCH block 1 and SS/PBCH block 2 have a QCL, and SS/PBCH block 3 and SS/PBCH block 4 have a QCL, the first indication information only needs to indicate transmission statuses of SI corresponding to SS/PBCH block 1 and SS/PBCH block 3, so that the quantity of bits required by the first indication information may be compressed from 32 bits to 16 (16=2*8) bits. This is equivalent to that transmission statuses of SI corresponding to a plurality of SS/PBCH blocks having a QCL may be indicated by sharing same bits, so that signaling overheads of the first indication information can be reduced.

Optionally, the downlink signal blocks having the QCL may be indicated by the gNB. The gNB may send second indication information, where the second indication information may indicate the downlink signal blocks having the QCL. Optionally, the downlink signal blocks having the QCL may alternatively be statically defined in a protocol or configured by the gNB by using higher layer signaling (for example, radio resource control (radio resource control, RRC) signaling).

Optionally, when the SI is specifically on-demand OSI, the second indication information may be carried in one or more of the following: remaining minimum system information RMSI and an SS/PBCH block. This is not limited thereto, and the second indication information may alternatively be carried in independent signaling.

(2) Manner 2: For a plurality of pieces of SI having a binding sending relationship, the first indication information may indicate a transmission status of only one of the plurality pieces of SI corresponding to different downlink signal blocks (for example, SS/PBCH blocks). For example, if in eight pieces of SI (SIB 1 to SIB 8), SIB 1 and SIB 2 have a binding sending relationship, SIB 3 and SIB 4 have a binding sending relationship, SIB 5 and SIB 6 have a binding sending relationship, and SIB 7 and SIB 8 have a binding sending relationship, the first indication information only needs to indicate sending statuses of SIBs 1, 3, 5, and 7 corresponding to different SS/PBCH blocks, or only needs to indicate sending statuses of SIBs 2, 4, 6, and 8 corresponding to different SS/PBCH blocks.

In other words, the first indication information may indicate a mapping between one or more downlink signal blocks and only one of the plurality of pieces of SI, and the plurality of pieces of SI have a binding sending relationship. Herein, that the plurality of pieces of SI have a binding sending relationship means that downlink signal blocks corresponding to the plurality of pieces of SI are the same and the plurality of pieces of SI need to be sent together. To be specific, the plurality of pieces of SI are transmitted together or not transmitted together in a same beam direction. Optionally, a plurality of pieces of SI of a same type have a binding sending relationship, and need to be sent together.

For example, it is assumed that the gNB transmits four SS/PBCH blocks, and the four SS/PBCH blocks all correspond to eight pieces of SI, SIB 1 to SIB 8 in total. It can be learned from FIG. 7A or FIG. 7B that the first indication information requires a total of 32 (32=4*8) bits. If SIB 1 and SIB 2 have a binding sending relationship, SIB 3 and SIB 4 have a binding sending relationship, SIB 5 and SIB 6 have a binding sending relationship, and SIB 7 and SIB 8 have a binding sending relationship, the first indication information only needs to indicate transmission statuses of SIBs 1, 3, 5, and 7 (or SIBs 2, 4, 6, and 8) respectively corresponding to the four SS/PBCH blocks, so that the quantity of bits required by the first indication information may be compressed from 32 bits to 16 (16=4*4) bits. This is equivalent to that transmission statuses of a plurality of pieces of SI that are corresponding to a same downlink signal block and that have a binding sending relationship may be indicated by sharing same bits, so that signaling overheads of the first indication information can be reduced.

Optionally, SI that needs to be sent together (that is, SI having a binding sending relationship) may be indicated by the gNB. The gNB may send third indication information, where the third indication information may indicate SI that needs to be sent together. Optionally, the third indication information may indicate SI of a same type, and the SI of a same type needs to be sent together. Optionally, SI that needs to be sent together may alternatively be statically defined in a protocol or configured by the gNB by using higher layer signaling (for example, RRC signaling). SI of a type same as the type of the SI statically defined in the protocol or configured by using the higher layer signaling needs to be sent together.

Optionally, when the SI is specifically on-demand OSI, the third indication information may be carried in one or more of the following: remaining minimum system information RMSI and an SS/PBCH block. This is not limited thereto, and the third indication information may alternatively be carried in independent signaling.

(3) Manner 3: In addition to separately using the foregoing Manner 1 or the foregoing Manner 2 to indicate the sending status of the SI, the gNB may alternatively use both the foregoing Manner 1 and the foregoing Manner 2 to indicate the sending status of the SI, so that signaling overheads can be reduced to a greater extent.

For example, it is assumed that the gNB transmits four SS/PBCH blocks, and the four SS/PBCH blocks all correspond to eight pieces of SI, SIB 1 to SIB 8 in total. It can be learned from FIG. 7A or FIG. 7B that the first indication information requires a total of 32 (32=4*8) bits. If SS/PBCH block 1 and SS/PBCH block 2 have a QCL SS/PBCH block 3 and SS/PBCH block 4 have a QCL, SIB 1 and SIB 2 have a binding sending relationship. SIB 3 and SIB 4 have a binding sending relationship, SIB 5 and SIB 6 have a binding sending relationship, and SIB 7 and SIB 8 have a binding sending relationship, the first indication information only needs to indicate transmission statuses of SIBs 1, 3, 5, and 7 (or SIBs 2, 4, 6, and 8) respectively corresponding to SS/PBCH block 1 and SS/PBCH block 3, so that the quantity of bits required by the first indication information may be compressed from 32 bits to 8 (8=2*4) bits.

(4) Resource Configuration of SI

Manner 1: A time location that corresponds to the downlink signal block and that is used to send SI is preconfigured.

Figure 8:
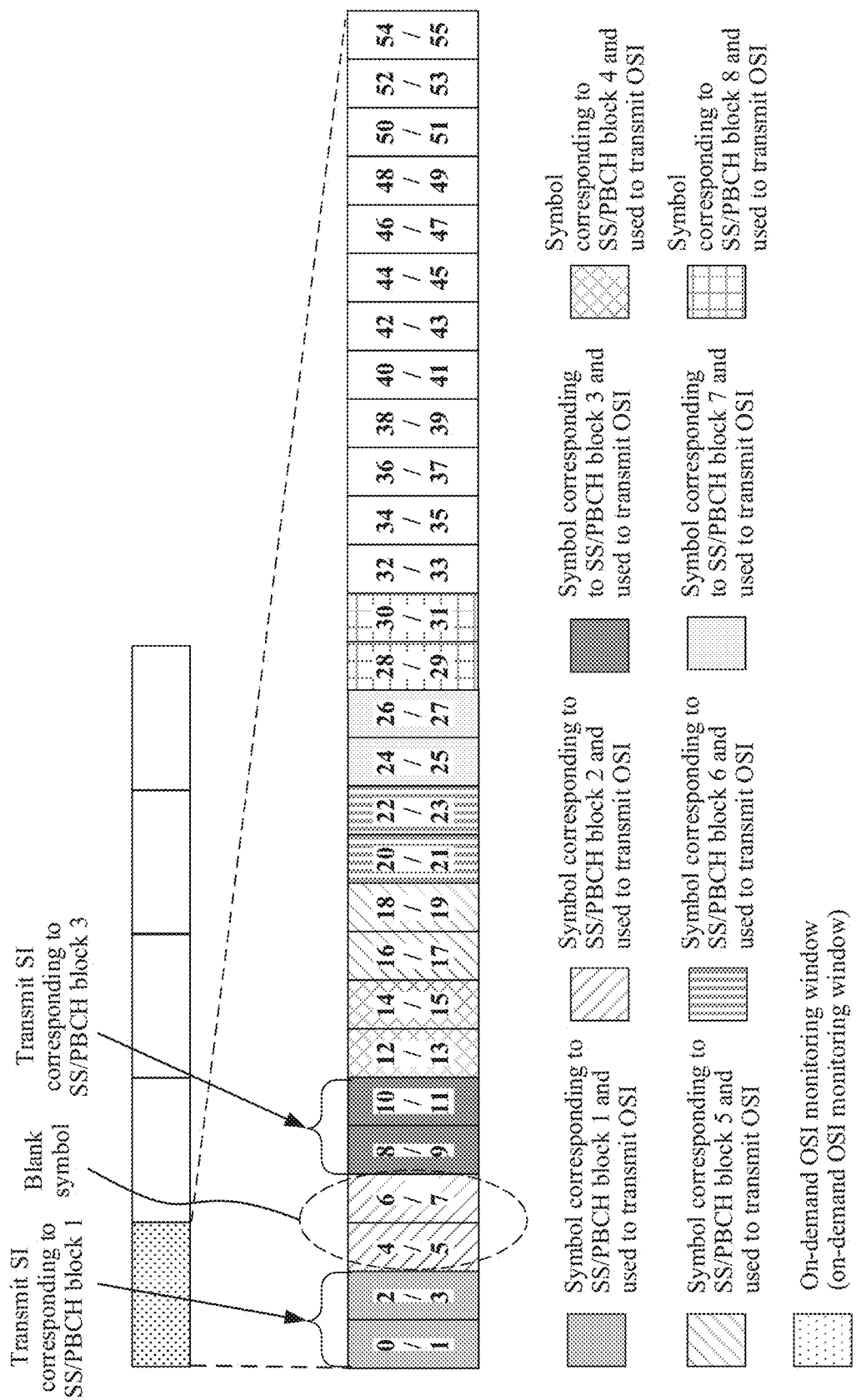
FIG. 8 is a schematic diagram of an SI resource configuration according to this application.

As shown in FIG. 8, in an on-demand OSI monitoring window, the gNB preconfigures preset time locations (for example, symbols) that respectively correspond to SS/PBCH blocks 1 to 8 and that are used to transmit OSI. Specifically, the preset time locations that respectively correspond to SS/PBCH blocks 1 to 8 in the on-demand OSI monitoring window and that are used to transmit OSI are symbols 0 to 3, symbols 4 to 7, symbols 8 to 11, symbols 12 to 15, symbols 16 to 19, symbols 20 to 23, symbols 24 to 27, and symbols 28 to 31 respectively. In this application, the on-demand OSI monitoring window may be referred to as a first time window, and duration of the on-demand OSI monitoring window is not limited.

In this application, a time location of SI having a QCL with a downlink signal block is a preset time location that corresponds to the downlink signal block in a first time window and that is used to send SI.

In a possible case, a blank symbol may exist between preset time locations, in the first time window, corresponding to downlink signal blocks corresponding to SI transmitted by the gNB. The blank symbol is a symbol that is not occupied by the SI. In an NRU scenario, the blank symbol causes discontinuous transmission, resulting in a channel loss. In this regard, optionally, the blank symbol may be filled by a first downlink signal, to avoid the channel loss caused by the discontinuous data transmission. The first downlink signal may be a downlink data signal or the like.

For example, as shown in FIG. 8, it is assumed that the gNB needs to transmit SI having a QCL with SS/PBCH block 1 and SI having a QCL with SS/PBCH block 3. In this case, a time location of the SI having a QCL with SS/PBCH block 1 is a preset time location that respectively corresponds to SS/PBCH block 1 in the on-demand OSI monitoring window and that is used to transmit OSI, that is, symbols 0 to 3; and a time location of the SI having a QCL with SS/PBCH block 3 is a preset time location that respectively corresponds to the SS/PBCH block 3 in the on-demand OSI monitoring window and that is used to transmit OSI, that is, symbols 8 to 11. It can be learned that symbols 4 to 7 between symbols 0 to 3 and symbols 8 to 11 do not carry SI, and are blank symbols. In an NRU system, to prevent a channel loss of the gNB, the gNB may fill the first downlink signal on symbols 4 to 7.

In Manner 1, for a specific terminal, the terminal may receive SI at a preset time location corresponding to a portion of downlink signal blocks in the first time window. The portion of downlink signal blocks have a QCL with SI transmitted by the network device for the terminal.

Optionally, in the NRU system, as long as the gNB may start performing LBT in a time window that lasts several symbols (for example, 10 symbols) at a preset time location that corresponds to a downlink signal block and that is used to transmit SI. If the LBT passes, the gNB may transmit the SI having a QCL with the downlink signal block corresponding to the preset time location. Correspondingly, the terminal only needs to start detecting the SI in a time window that lasts several symbols (for example, 10 symbols) at the preset time location. The time window is used to reduce the impact of the LBT on sending the SI and improve the success rate of sending the SI.

Extension of Manner 1

Figure 10:
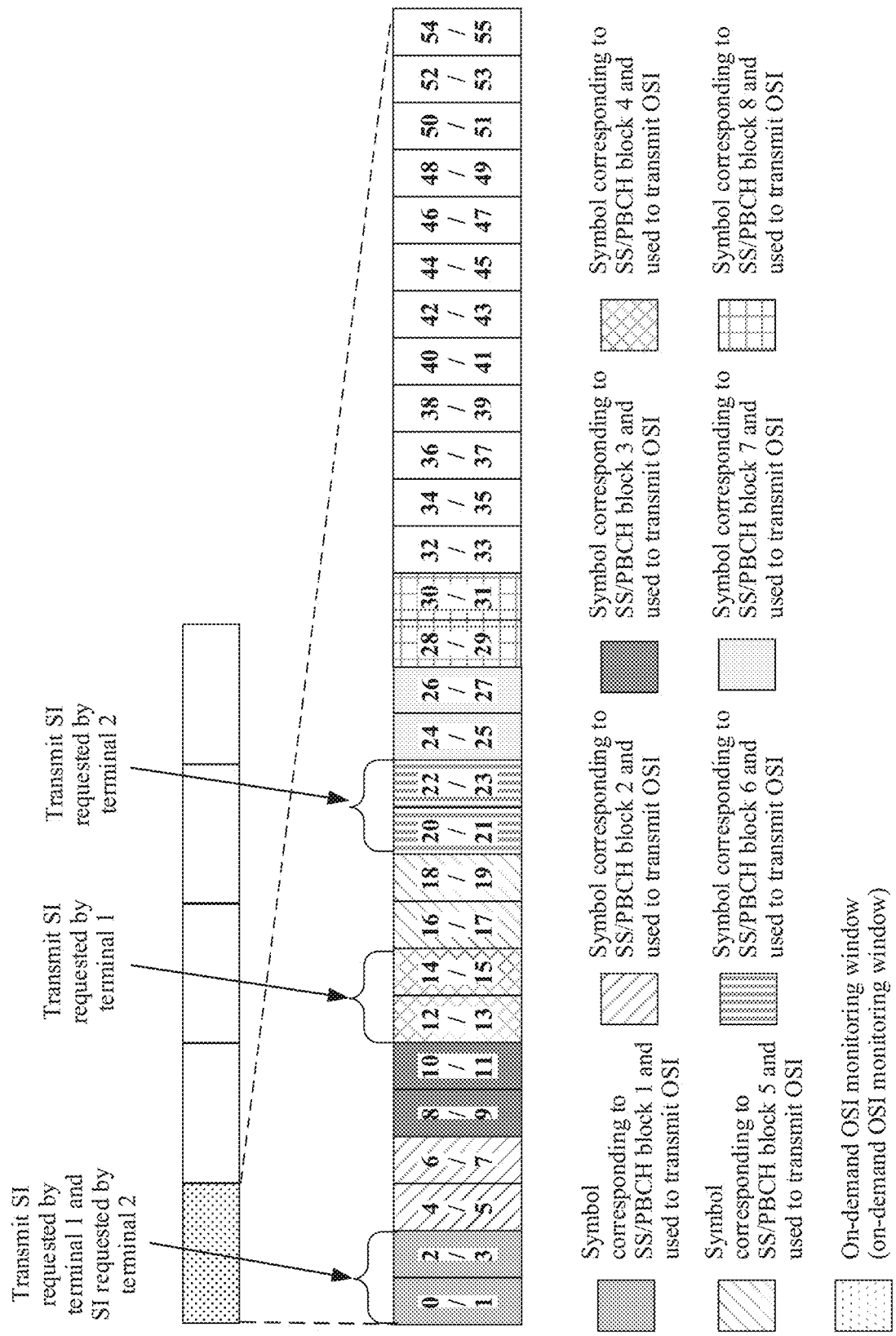
FIG. 10 is a schematic diagram of still another SI resource configuration according to this application.

It is assumed that the gNB needs to transmit, based on a request of terminal 1, SI having a QCL with SS/PBCH block 1 and SI having a QCL with SS/PBCH block 4, and the gNB needs to transmit, based on a request of terminal 2, SI having a QCL with SS/PBCH block 1 and SI having a QCL with SS/PBCH block 6. It can be learned that both terminal 1 and terminal 2 request the SI having a QCL with SS/PBCH block 1. An implementation of transmitting SI by the gNB may include:

(1) Case 1: A resource at a preset time location (symbols 0 to 3) corresponding to SS/PBCH block 1 in the first time window can carry SI requested by terminal 1 and terminal 2. In this case, for a method for transmitting SI by the gNB, refer to Manner 1 shown in FIG. 8. To be specific, as shown in FIG. 10, SI having a QCL with a SS/PBCH block is transmitted at a preset time location corresponding to the SS/PBCH block.

Figure 11:
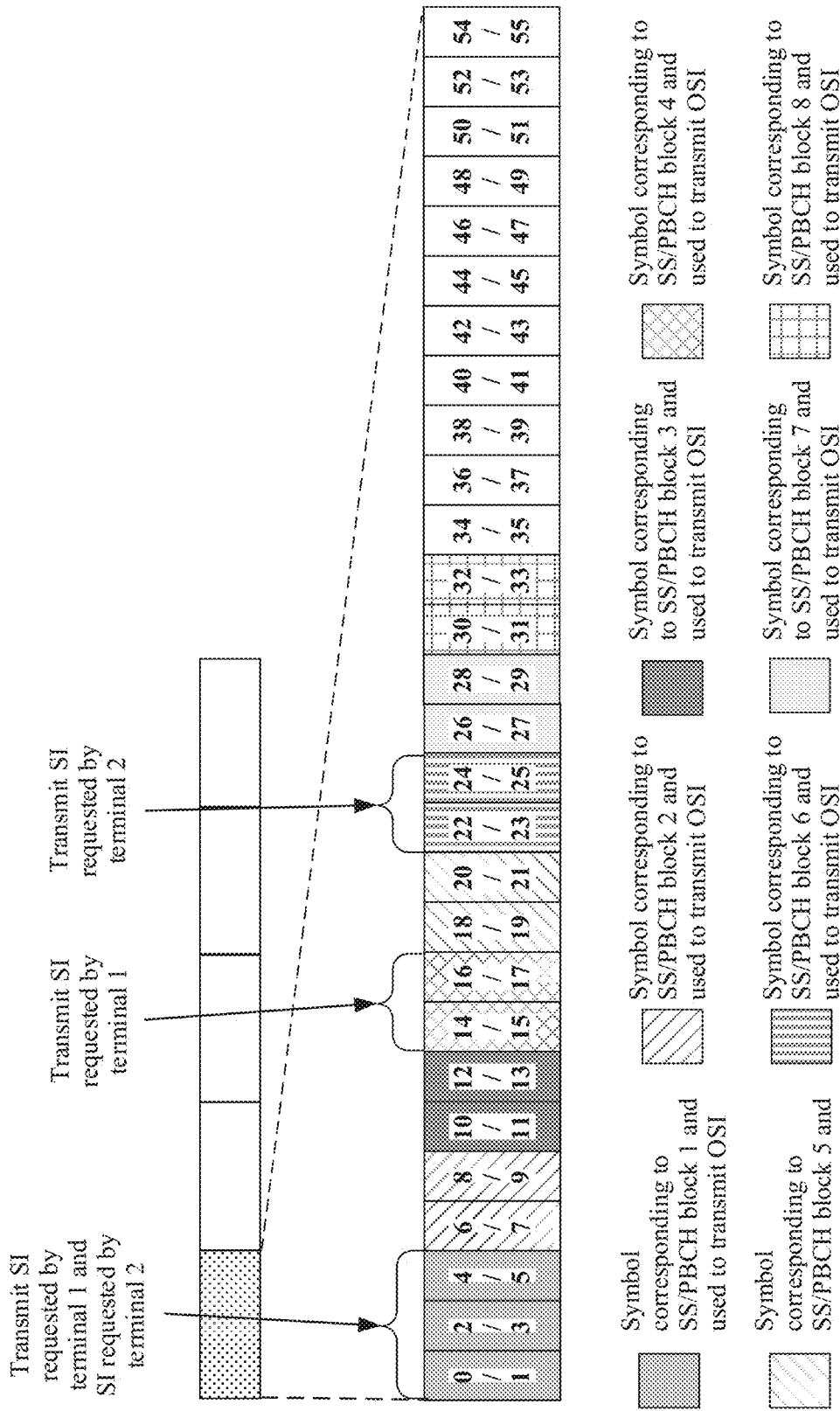
FIG. 11 is a schematic diagram of yet another SI resource configuration according to this application.

(2) Case 2: A resource at a preset time location (symbols 0 to 3) corresponding to SS/PBCH block 1 in the first time window cannot carry SI requested by terminal 1 and terminal 2. In this case, the gNB needs to indicate an updated SI sending time domain pattern. As shown in FIG. 11, four symbols that correspond to original SS/PBCH block 1 and that is used to transmit S are extended to six symbols (updated to symbols 0 to 5), and time locations that correspond to other SS/PBCH blocks and that are used to transmit SI are backed by two symbols. Optionally, the gNB may also indicate, in signaling such as PBCH/RMSI/OSI/RRC, a quantity of continuous symbols of SI having a QCL with each SS/PBCH block or the entire SI sending time domain pattern.

Specifically, when a size of SI (for example, each SIB in the on-demand OSI) is fixed, and a size of a time-frequency resource used to transmit SI and a transmission bit rate of SI are determined, the terminal may calculate a specific pattern for time-domain transmission of SI based on an SI transmission indication sent by the gNB. The SI transmission indication may include a time location that corresponds to a beam and that is used to transmit SI. In other words, without the indication of the gNB, the terminal may determine, based on the size of the SI, the size of the time-frequency resource used to transmit SI, the transmission bit rate of the SI, and the SI transmission indication, a quantity of symbols required for transmitting SI, to determine the updated SI sending time domain pattern.

Manner 2: A time location for sending SI is dynamically allocated.

Specifically, the gNB dynamically allocates time locations of SI having a QCL with downlink signal blocks, so that the SI is continuously sent. In other words, in Manner 2, time locations at which the gNB transmits the SI are continuous. In this way, a blank symbol can be avoided. For an unlicensed spectrum, the gNB does not need to fill a second downlink signal during SI transmission.

Figure 9:
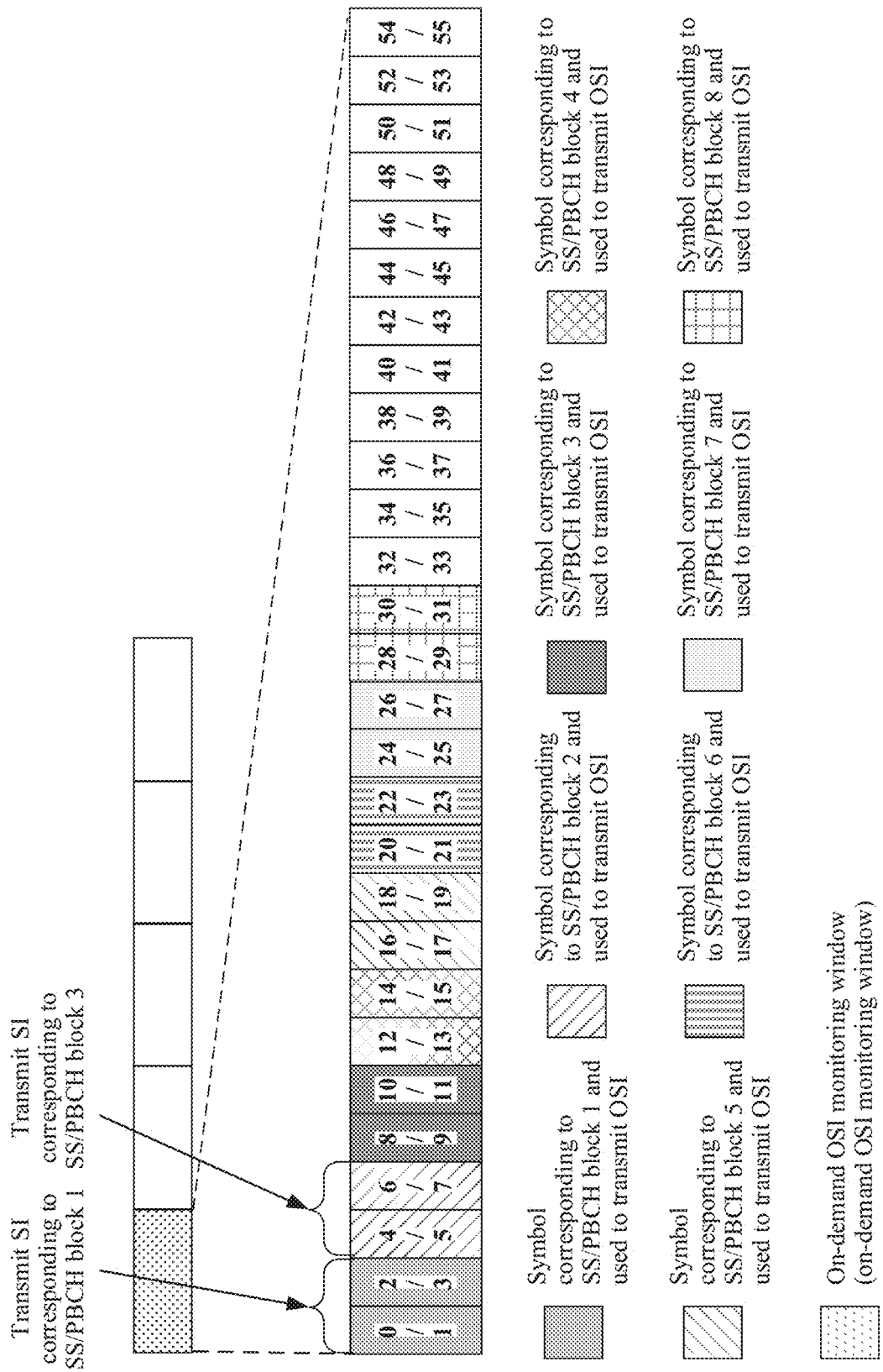
FIG. 9 is a schematic diagram of another SI resource configuration according to this application.

For example, as shown in FIG. 9, in an on-demand OSI monitoring window, the gNB preconfigures preset time locations that respectively correspond to SS/PBCH blocks 1 to 8 and that are used to transmit OSI. Specifically, the preset time locations that respectively correspond to SS/PBCH blocks 1 to 8 in the on-demand OSI monitoring window and that are used to transmit OSI are symbols 0 to 3, symbols 4 to 7, symbols 8 to 11, symbols 12 to 15, symbols 16 to 19, symbols 20 to 23, symbols 24 to 27, and symbols 28 to 31 respectively. It is assumed that the gNB needs to transmit SI having a QCL with SS/PBCH block 1 and SI having a QCL with SS/PBCH block 3. Therefore, to avoid blank symbols and ensure continuous transmission of SI, the gNB may transmit the SI having a QCL with SS/PBCH block 1 on symbols 0 to 3, and transmit the SI having a QCL with SS/PBCH block 3 on symbols 4 to 7 instead of symbols 8 to 11.

In Manner 2, the gNB may send fourth indication information, where the fourth indication information indicates time locations at which SI having a QCL with different downlink signal blocks is actually transmitted by the gNB. For a specific terminal, the terminal may receive the fourth indication information, determine, based on the fourth indication information, time locations of SI having a QCL with a portion of downlink signal blocks, and receive the SI at the time locations. The portion of downlink signal blocks have a QCL with the SI transmitted by the network device for the terminal. Optionally, the terminal may alternatively receive the SI through blind detection, and the gNB does not need to send the fourth indication information.

The technical solutions provided in this application may be applicable to a licensed band (licensed band), or applicable to an unlicensed band (unlicensed band).

In an unlicensed band, for a specific terminal, the gNB may perform LBT on an antenna port having a QCL with a portion of downlink signal blocks. If the LBT passes, the gNB only transmits system information SI having a QCL with the portion of downlink signal blocks. In other words, for the specific terminal, the gNB can transmit the SI in directions of some base station transmitted beams only by performing LBT in the directions of the some base station transmitted beams instead of directions of all base station transmitted beams. In this way, the LBT success probability can be increased, and the probability of successfully sending the SI can be increased, because directional LBT is easier than omnidirectional LBT.

In an unlicensed band, the gNB needs to perform LBT before transmitting SI, and an LBT priority is related to a signal transmission time. The LBT priority determines the time for a device for performing LBT to detect that the channel is idle. When the gNB sends SI in directions of all base station transmitted beams, SI transmission duration is relatively long, and LBT with a lower priority needs to be used. When the gNB sends SI only in directions of some base station transmitted beams, SI transmission duration is relatively short, and LBT with a higher priority may be used. The LBT with a high priority needs to be performed for a relatively short time. For example, CAT2 LBT with a high priority needs to be performed for only at 25 us. If it is detected that the channel is in an idle state within 25 us, the LBT succeeds, that is, the LBT passes. In other words, for a solution in which the gNB sends SI only in directions of some base station transmitted beams, the gNB may use LBT with a high priority, to increase the LBT success probability and increase the success probability of sending the SI.

Figure 12:
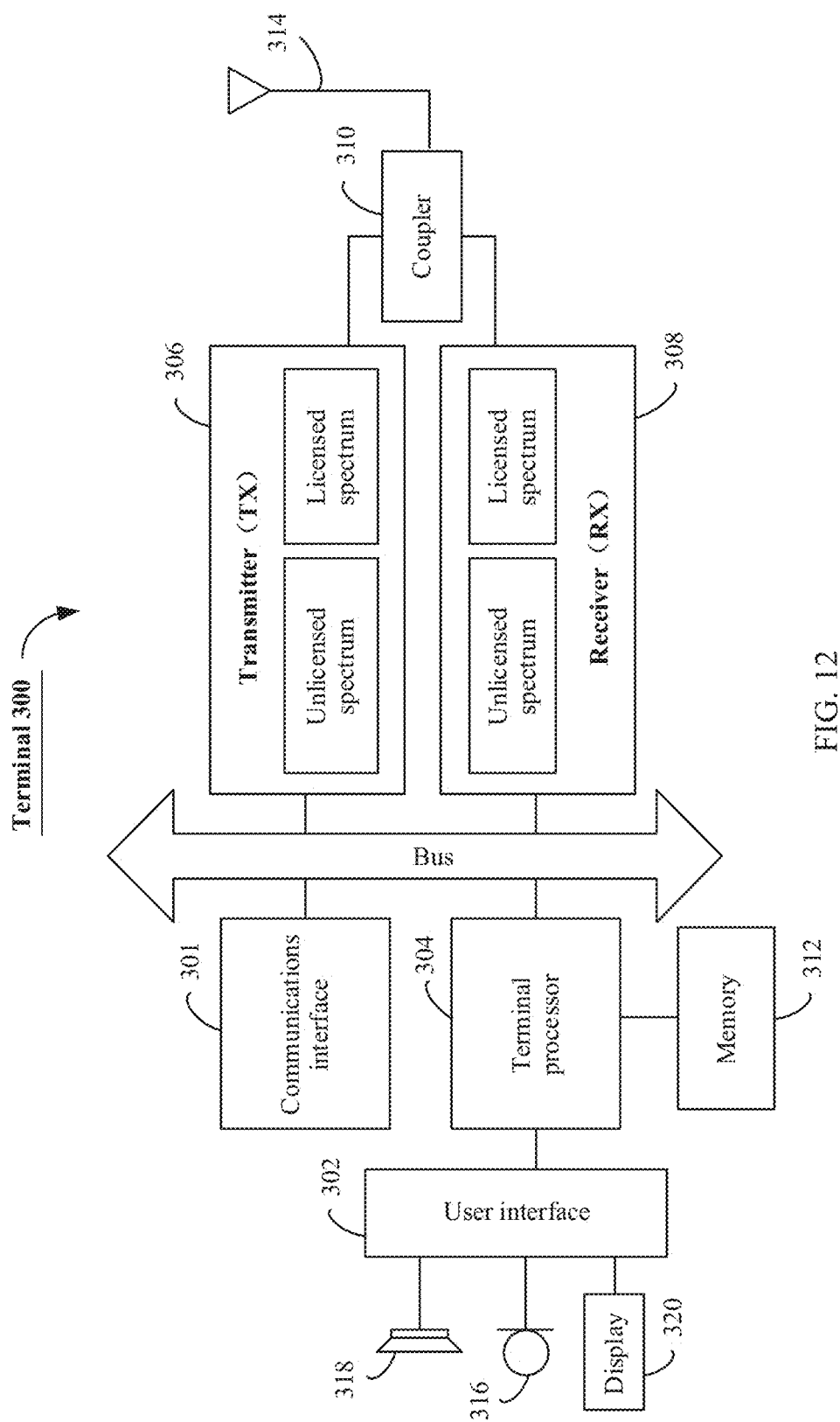
FIG. 12 is a schematic diagram of a hardware architecture of a terminal device according to an embodiment of this application.

Referring to FIG. 12, FIG. 12 shows a terminal 300 according to some embodiments of this application. As shown in FIG. 12, the terminal 300 may include an input/output module (including an audio input/output module 318, a key input module 316, a display 320, and the like), a user interface 302, one or more terminal processors 304, a transmitter 306, a receiver 308, a coupler 310, an antenna 314, and a memory 312. These components may be connected by using a bus or in another manner. An example in which the components are connected by using a bus is used in FIG. 12.

The communications interface 301 may be used by the terminal 300 to communicate with another communications device, for example, a base station. Specifically, the base station may be the network device 400 shown in FIG. 12. The communications interface 301 is an interface between the terminal processor 304 and a transceiver system (consisting of the transmitter 306 and the receiver 308), for example, an X1 interface in LTE. In specific implementation, the communications interface 301 may include one or more of a global system for mobile communications (Global System for Mobile Communication, GSM) (2G) communications interface, a wideband code division multiple access (WCDMA) (3G) communications interface, a long term evolution (LTE) (4G) communications interface, and the like, or may be a communications interface of 4.5G, 5G, or future new radio. The terminal 300 may be further configured with a wired communications interface 301, for example, a local access network (Local Access Network, LAN) interface, not limited to the wireless communications interfaces.

The antenna 314 may be configured to convert electromagnetic energy in a transmission line into an electromagnetic wave in free space, or convert an electromagnetic wave in free space into electromagnetic energy in a transmission line. The coupler 310 is configured to divide a mobile communication signal received by the antenna 314 into a plurality of channels of signals, and allocate the plurality of channels of signals to a plurality of receivers 308.

The transmitter 306 may be configured to perform transmission processing on a signal output by the terminal processor 304, for example, modulating the signal to a signal on a licensed band, or modulating the signal to a signal on an unlicensed band. In other words, the transmitter 306 may support the terminal 300 in transmitting a signal on one or more unlicensed spectrums, or may support the terminal 300 in transmitting a signal on one or more licensed spectrums.

The receiver 308 may be configured to perform receiving processing on the mobile communication signal received by the antenna 314. For example, the receiver 308 may demodulate a received signal that has been modulated on the unlicensed band, or may demodulate a received signal that has been modulated on the licensed band. In other words, the receiver 308 may support the terminal 300 in receiving a signal modulated on an unlicensed spectrum, or may support the terminal 300 in receiving a signal modulated on a licensed spectrum.

In some embodiments of this application, the transmitter 306 and the receiver 308 may be considered as one wireless modem. In the terminal 300, there may be one or more transmitters 306 and receivers 308.

In addition to the transmitter 306 and the receiver 308 shown in FIG. 12, the terminal 300 may further include another communications component, for example, a GPS module, a Bluetooth (Bluetooth) module, or a Wireless Fidelity (Wireless Fidelity, Wi-Fi) module. The terminal 300 may further support another wireless communication signal, for example, a satellite signal or a short wave signal, not limited to the foregoing described wireless communication signal. The terminal 300 may be further configured with a wired network interface (for example, a LAN interface) to support wired communication, not limited to wireless communication.

The input/output module may be configured to implement interaction between the terminal 300 and the user/external environment, and may mainly include an audio input/output module 318, a key input module 316, a display 320, and the like. In specific implementation, the input/output module may further include a camera, a touchscreen, a sensor, and the like. The input/output module communicates with the terminal processor 304 by using the user interface 302.

The memory 312 is coupled to the terminal processor 304, and is configured to store various software programs and/or a plurality of groups of instructions. In specific implementation, the memory 312 may include a high-speed random access memory, and may also include a non-volatile memory, for example, one or more magnetic disk storage devices, a flash memory device, or another non-volatile solid-state storage device. The memory 312 may store an operating system (hereinafter referred to as a system), for example, an embedded operating system such as ANDROID, iOS, WINDOWS, or LINUX. The memory 312 may further store a network communication program. The network communication program may be configured to communicate with one or more additional devices, one or more terminal devices, and one or more network devices. The memory 312 may further store a user interface program. The user interface program may visually display content of an application program by using a graphical operation interface, and receive a control operation performed by the user on the application program by using an input control such as a menu, a dialog box, and a button.

In some embodiments of this application, the memory 312 may be configured to store an implementation program of the system information transmission method on a terminal 300 side according to one or more embodiments of this application. For implementation of the system information transmission method provided in one or more embodiments of this application, refer to subsequent embodiments.

The terminal processor 304 may be configured to read and execute computer-readable instructions. Specifically, the terminal processor 304 may be configured to invoke a program stored in the memory 312, for example, a program for implementing the system information transmission method on the terminal 300 side according to one or more embodiments of this application, and execute instructions included in the program.

The terminal processor 304 may be a modem (Modem) processor, and is a module for implementing main functions in wireless communications standards such as 3GPP and ETSI. The modem may be used as an independent chip, or may be combined with other chips or circuits to form a system-level chip or an integrated circuit. These chips or integrated circuits may be applied to all devices that implement wireless communication functions, including a mobile phone, a computer, a notebook, a tablet, a router, a wearable device, an automobile, and a home appliance. It should be noted that, in different implementations, the processor of the terminal processor 304 may be used as an independent chip and coupled to an off-chip memory, that is, the chip does not include a memory. Alternatively, the processor of the terminal processor 304 is coupled to an on-chip memory and integrated into a chip, that is, the chip includes the memory.

It may be understood that the terminal 300 may be the terminal 103 in the wireless communications system 100 shown in FIG. 2, and may be implemented as a mobile device, a mobile station (mobile station), a mobile unit (mobile unit), a wireless unit, a remote unit, a user agent, a mobile client, or the like.

It should be noted that the terminal 300 shown in FIG. 12 is merely an implementation of this application. In actual application, the terminal 300 may alternatively include more or fewer components. This is not limited herein.

Figure 13:
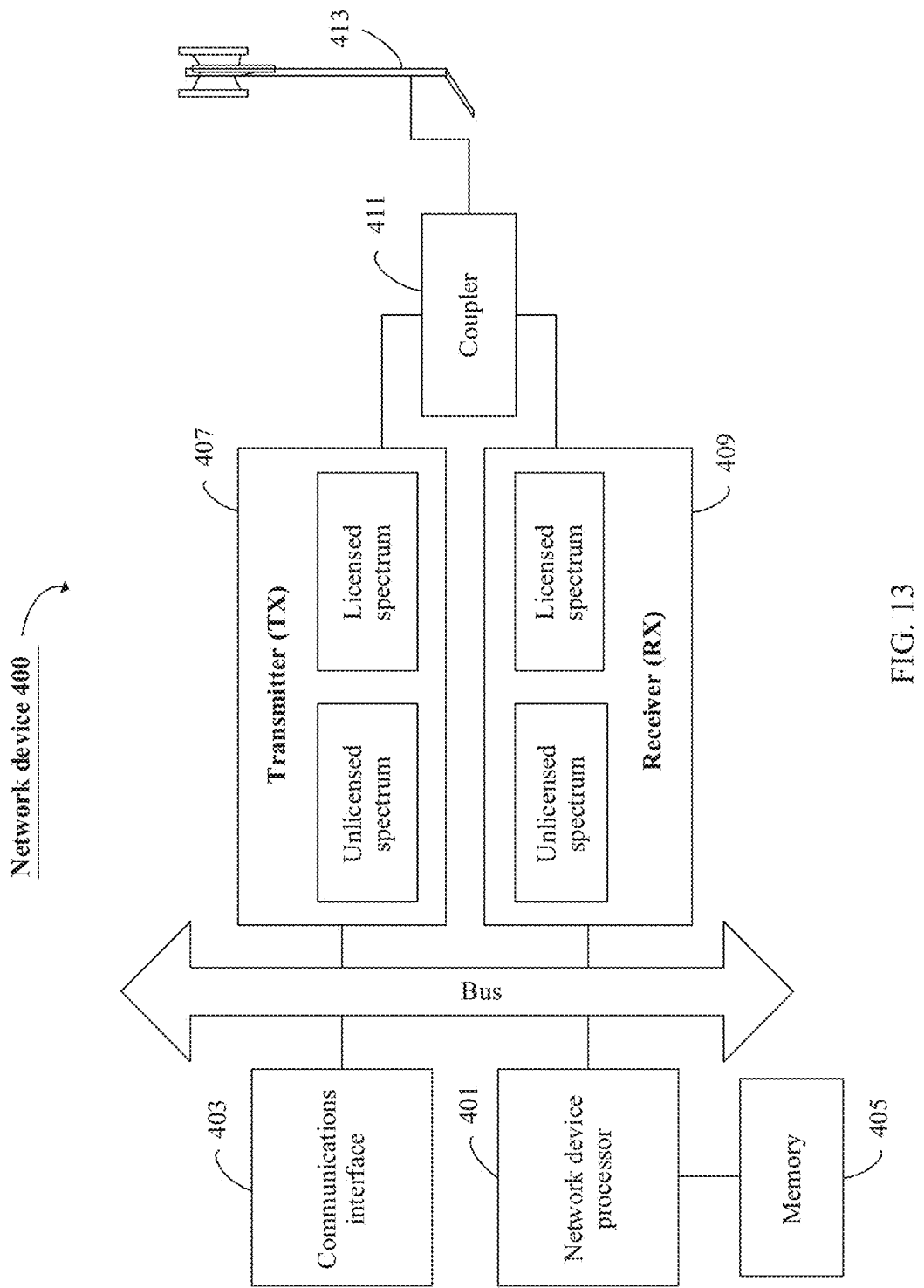
FIG. 13 is a schematic diagram of a hardware architecture of a network device according to an embodiment of this application.

Referring to FIG. 13, FIG. 13 shows a network device 400 according to some embodiments of this application. As shown in FIG. 13, the network device 400 may include a communications interface 403, one or more network device processors 401, a transmitter 407, a receiver 409, a coupler 411, an antenna 413, and a memory 405. These components may be connected by using a bus or in another manner. An example in which the components are connected by using a bus is used in FIG. 13.

The communications interface 403 may be configured to communicate with another communications device, for example, a terminal device or another base station. Specifically, the terminal device may be the terminal 300 shown in FIG. 9. The communications interface 301 is an interface between the network device processor 401 and a transceiver system (consisting of the transmitter 407 and the receiver 409), for example, an S1 interface in LTE. In specific implementation, the communications interface 403 may include one or more of a global system for mobile communication (GSM) (2G) communications interface, a wideband code division multiple access (WCDMA) (3G) communications interface, a long term evolution (LTE) (4G) communications interface, and the like, or may be a communications interface of 4.5G, 5G, or future new radio. The network device 400 may be further configured with a wired communications interface 403, not limited to the wireless communications interfaces, to support wired communication. For example, a backhaul link between one network device 400 and another network device 400 may be a wired communication connection.

The antenna 413 may be configured to convert electromagnetic energy in a transmission line into an electromagnetic wave in free space, or convert an electromagnetic wave in free space into electromagnetic energy in a transmission line. The coupler 411 may be configured to divide a mobile communication signal into a plurality of channels of signals, and allocate the plurality of channels of signals to a plurality of receivers 409.

The transmitter 407 may be configured to perform transmission processing on a signal output by the network device processor 401, for example, modulating the signal to a signal on a licensed band, or modulating the signal to a signal on an unlicensed band. In other words, the transmitter 407 may support the network device 400 in transmitting a signal in one or more unlicensed spectrums, or may support the network device 400 in transmitting a signal in one or more licensed spectrums.

The receiver 409 may be configured to perform receiving processing on the mobile communication signal received by the antenna 413. For example, the receiver 409 may demodulate a received signal that has been modulated on the unlicensed band, or may demodulate a received signal that has been modulated on the licensed band. In other words, the receiver 409 may support the network device 400 in receiving a signal modulated on an unlicensed spectrum, or may support the network device 400 in receiving a signal modulated on a licensed spectrum.

In some embodiments of this application, the transmitter 407 and the receiver 409 may be considered as one wireless modem. In the network device 400, there may be one or more transmitters 407 and receivers 409.

The memory 405 is coupled to the network device processor 401, and is configured to store various software programs and/or a plurality of groups of instructions. In specific implementation, the memory 405 may include a high-speed random access memory, and may also include a non-volatile memory, for example, one or more magnetic disk storage devices, a flash memory device, or another non-volatile solid-state storage device. The memory 405 may store an operating system (hereinafter referred to as a system), for example, an embedded operating system such as uCOS, VxWorks, and RTLinux. The memory 405 may further store a network communication program. The network communication program may be configured to communicate with one or more additional devices, one or more terminal devices, and one or more network devices.

The network device processor 401 may be configured to perform radio channel management, establish and release a call and a communication link, control an over-area handover of user equipment in this current control area, and the like. In specific implementation, the network device processor 401 may include: an administration module/communication module (Administration Module/Communication Module, AM/CM) (a center for speech channel switching and information exchange), a basic module (Basic Module, BM) (configured to complete call processing, signaling processing, radio resource management, radio link management, and circuit maintenance functions), a transcoder and submultiplexer (Transcoder and SubMultiplexer, TCSM) (configured to complete multiplexing/demultiplexing and code conversion functions), and the like.

In this application, the network device processor 401 may be configured to read and execute computer-readable instructions. Specifically, the network device processor 401 may be configured to invoke a program stored in the memory 405, for example, a program for implementing the system information transmission method on the network device 400 side according to one or more embodiments of this application, and execute instructions included in the program.

The network device processor 401 may be a modem (Modem) processor, and is a module for implementing main functions in wireless communications standards such as 3GPP and ETSI. The modem may be used as an independent chip, or may be combined with other chips or circuits to form a system-level chip or an integrated circuit. These chips or integrated circuits may be applied to all network-side devices that implement wireless communication functions, which, for example, are referred to as an evolved NodeB (evolved NodeB, eNB or eNodeB) in an LTE network, referred to as a Node B (Node B) in the 3rd generation (the 3rd Generation, 3G) network, and referred to as a 5G base station (NR NodeB, gNB) in the 5G network. It should be noted that, in different implementations, the network device processor 401 may be used as an independent chip and coupled to an off-chip memory, that is, the chip does not include a memory. Alternatively, the processor of the network device processor 401 is coupled to an on-chip memory and is integrated into a chip, that is, the chip includes a memory.

It may be understood that the network device 400 may be the network device 101 in the wireless communications system 100 shown in FIG. 2, and may be implemented as a base transceiver station, a radio transceiver, a basic service set (BSS), an extended service set (ESS), a NodeB, an eNodeB, or the like. The network device 400 may be implemented as several different types of base stations, such as a macro base station and a micro base station. The network device 400 may apply different radio technologies, for example, a cell radio access technology or a WLAN radio access technology.

It should be noted that the network device 400 shown in FIG. 13 is merely an implementation of this application. In actual application, the network device 400 may alternatively include more or fewer components. This is not limited herein.

Figure 14:
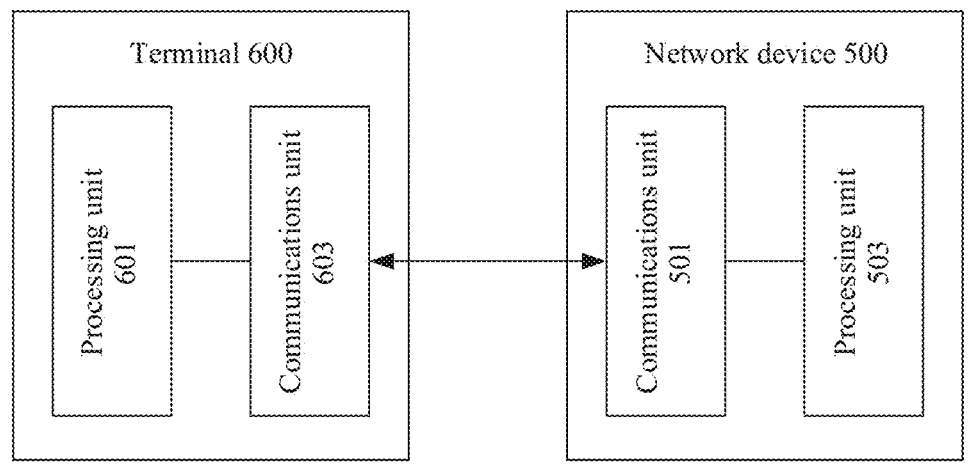
FIG. 14 is a functional block diagram of a wireless communications system, a terminal, and a network device according to this application.

Referring to FIG. 14, FIG. 14 shows a wireless communications system 10, and a network device 500 and a terminal 600 in the wireless communications system 10 according to an embodiment of this application. The network device 500 may be the network device in the foregoing method embodiments, and the terminal 600 may be the terminal in the foregoing method embodiments.

As shown in FIG. 14, the network device 500 may include a communications unit 501 and a processing unit 503.

The communications unit 501 may be configured to receive a system information request sent by one or more terminals 600.

The processing unit 503 may be configured to determine, based on the system information request, system information SI that needs to be transmitted.

The communications unit 501 may be further configured to transmit the system information SI, where SI transmitted for one terminal 600 has a quasi co-location QCL with only a portion of downlink signal blocks, and the portion of downlink signal blocks are a subset of all downlink signal blocks transmitted by the communications unit 501.

The communications unit 501 may be further configured to broadcast first indication information, where the first indication information indicates a mapping between a downlink signal block and the SI, and the downlink signal block has a QCL with the SI corresponding to the downlink signal block.

As shown in FIG. 14, the terminal 600 may include a processing unit 601 and a communications unit 603.

The communications unit 603 may be configured to receive first indication information broadcast by the network device 500, where the first indication information indicates a mapping between a downlink signal block and the SI, and the downlink signal block has a QCL with the SI corresponding to the downlink signal block.

The processing unit 601 may be configured to determine, based on the first indication information, whether SI having a QCL with the downlink signal block received by the terminal 600 has been sent.

The communications unit 603 may be further configured to; if the processing unit 601 determines that the SI that needs to be obtained by the terminal having a QCL with the downlink signal block received by the terminal 600 has been sent, detect the SI at a time location that corresponds to the received downlink signal block and that is used to receive SI; and if the processing unit 601 determines that the SI having a QCL with the downlink signal block received by the terminal 600 has not been sent, send a system information request to the network device 500, and then receive SI transmitted by the network device 500. The SI transmitted by the network device 500 for a specific terminal 600 has a quasi co-location QCL with only a portion of downlink signal blocks, and the portion of downlink signal blocks are a subset of all downlink signal blocks transmitted by the network device 500.

In this application, indicating a base station transmitted beam may be equivalent to indicating a downlink signal, for example, an SS/PBCH block or a CSI-RS, transmitted in the beam direction. In this application, the downlink signal may be referred to as a downlink signal block. Indicating SI carried in a base station transmitted beam may be equivalent to indicating SI having a quasi co-location QCL with a downlink signal block transmitted in a direction of the base station transmitted beam. For example, SI carried in base station transmitted beam 1 is S having a quasi co-location with SS/PBCH block 1 transmitted in the beam 1 direction.

In this application, the SI corresponding to the downlink signal block is SI transmitted by the network device in a beam direction in which the downlink signal block is transmitted. In other words, the first indication information may indicate a case in which different base station transmitted beams carry SI, that is, indicate which pieces of SI are carried or not carried in different base station transmitted beams.

It can be learned that, for an SI request sent by a specific terminal, the network device transmits SI by using only some base station transmitted beams, instead of using all base station transmitted beams. In this way, system overheads can be reduced. In addition, according to an indication of the network device, the terminal no longer needs to request, from the network device, SI that has been requested by another terminal or the terminal itself, and only needs to detect the SI at a resource location that corresponds to a downlink signal block received by the terminal and that is used to transmit SI. In this way, the terminal in a cell can be prevented from repeatedly requesting SI available in the cell, thereby reducing system overheads.

In this application, for a specific terminal 600, the processing unit 503 in the network device 500 may be configured to determine the portion of downlink signal blocks in, but not limited to, the following several manners:

Manner 1: A downlink signal block having a QCL with an SI request received by the network device 500. In other words, for the specific terminal 600, some base station transmitted beams used by the network device to transmit SI may include: a base station transmitted beam having a QCL with a base station received beam used by the network device 500 to receive the SI request, or further include P (P is a positive integer) adjacent beams of the base station transmitted beam.

Manner 2: A downlink signal block having a QCL with an SI request transmitted by the specific terminal 600. In other words, for the specific terminal 600, some base station transmitted beams used by the network device 500 to transmit SI may include: a base station transmitted beam having a QCL with a terminal transmitted beam used by the specific terminal 600 to transmit the SI request, or further include Q (Q is a positive integer) adjacent beams of the base station transmitted beam.

Manner 3: A downlink signal block indicated by the specific terminal 600. In other words, the specific terminal 600 may indicate, to the network device 500, which base station transmitted beam or which base station transmitted beams are used to transmit SI.

Manner 4: A downlink signal block configured by a system. In other words, the system may configure some base station transmitted beams for the network device to transmit SI. Optionally, in a scenario in which the terminal 600 is stationary or a movement range of the terminal 600 is very limited, the system may configure, for the terminal 600, some base station transmitted beams for transmitting SI.

It can be learned that, for a specific terminal, the network device sends SI only in a beam direction in which the network device receives the SI request, or in the beam direction and some adjacent beam directions, or in a beam direction in which the terminal sends the SI request, or in the beam direction and some adjacent beam directions, or in a beam direction configured by the system, or in a beam direction requested by the terminal, to thereby greatly reduce system overheads required for sending the SI, and improve system efficiency.

In this application, two main implementations of the first indication information may include:

Implementation 1: The first indication information may include H groups of bits, each group of bits includes M bits, one bit corresponds to one SI, and a $j^{th}$ piece of bit in an $i^{th}$ group of bits indicates whether $j^{th}$ piece of SI corresponding to an $i^{th}$ downlink signal block has been sent. H is a positive integer, M is a positive integer, $i \in (1, H)$, $j \in (1, M)$, i is a positive integer, and j is a positive integer.

Optionally, when a value of the $j^{th}$ piece of bit in the $i^{th}$ group of bits is '1', it may indicate that the $j^{th}$ piece of SI corresponding to the $i^{th}$ downlink signal block has been sent by the network device. When the value of the $j^{th}$ piece of bit in the $i^{th}$ group of bits is '0', it may indicate that the $j^{th}$ piece of SI corresponding to the $i^{th}$ downlink signal block has not been sent by the network device. This is not limited thereto, and it may also be specified that the bit value '0' indicates that the corresponding SI has been sent by the network device, and the bit value '1' indicates that the corresponding SI has not been sent by the network device. In actual application, a plurality of bits may alternatively be used to correspond to one piece of SI.

Implementation 2: The first indication information may include: W groups of bits, one group of bits corresponds to one piece of SI, each group of bits includes Y bits, and one bit corresponds to one downlink signal block. An $n^{th}$ bit in an in group of bits indicates whether $m^{th}$ piece of SI corresponding to an n downlink signal block has been sent. W is a positive integer, Y is a positive integer, $m \in (1, W)$, $n \in (1, Y)$, m is a positive integer, and n is a positive integer.

Optionally, when a value of the $n^{th}$ bit in the $m^{th}$ group of bits is '1', it may indicate that the $m^{th}$ SI corresponding to the $n^t$h downlink signal block has been sent by the network device. When the value of the $n^{th}$ bit in the m group of bits is '0', it may indicate that the m SI corresponding to the $n^{th}$ downlink signal block has not been sent by the network device. This is not limited thereto, and it may also be specified that the bit value '0' indicates that the corresponding SI has been sent by the network device, and the bit value '1' indicates that the corresponding SI has not been sent by the network device. In actual application, a plurality of bits may alternatively be used to correspond to one downlink signal block.

Optionally, when the SI is specifically on-demand OSI, the first indication information may be carried in one or more of the following: remaining minimum system information RMSI and an SS/PBCH block. This is not limited thereto, and the first indication information may alternatively be carried in independent signaling.

It may be inferred that when there are a relatively large quantity of downlink signal blocks or a relatively large amount of SI, a large quantity of bits are required for the implementation of the first indication information. For example, when the network device transmits eight SS/PBCH blocks, and each SS/PBCH block corresponds to eight pieces of SI, the first indication information needs 64 (64=8*8) bits. In this case, signaling overheads required by the first indication information are relatively large.

Further, to reduce signaling overheads required by the first indication information, the first indication information may use, but not limited to, the following several implementations:

(1) Manner 1: For a plurality of downlink signal blocks (for example, SS/PBCH blocks) having a QCL, the first indication information may indicate a transmission status of SI corresponding to only one downlink signal block. For example, if the network device 500 transmits eight SS/PBCH blocks, where SS/PBCH block 1 and SS/PBCH block 2 have a QCL, and SS/PBCH block 3 and SS/PBCH block 4 have a QCL, SS/PBCH block 5 and SS/PBCH block 6 have a QCL, and SS/PBCH block 7 and SS/PBCH block 8 have a QCL, the first indication information only needs to indicate sending statuses of SI corresponding to SS/PBCH blocks 1, 3, 5, and 7, or only needs to indicate sending statuses of SI corresponding to SS/PBCH blocks 2, 4, 6, and 8.

In other words, the first indication information may indicate a mapping between only one of a plurality of downlink signal blocks and SI. The plurality of downlink signal blocks have a QCL. Transmission statuses of SI corresponding to the downlink signal blocks having the QCL are the same.

Optionally, the downlink signal blocks having the QCL may be indicated by the network device 50. The communications unit 501 in the network device 500 may send second indication information, where the second indication information may indicate the downlink signal blocks having the QCL. Optionally, the downlink signal blocks having the QCL may alternatively be statically defined in a protocol or configured by the network device 500 by using higher layer signaling (for example, radio resource control (radio resource control, RRC) signaling).

Optionally, when the SI is specifically on-demand OSI, the second indication information may be carried in one or more of the following: remaining minimum system information RMSI and an SS/PBCH block. This is not limited thereto, and the second indication information may alternatively be carried in independent signaling.

(2) Manner 2: For a plurality of pieces of SI having a binding sending relationship, the first indication information may indicate a transmission status of only one of the plurality pieces of SI corresponding to different downlink signal blocks (for example, SS/PBCH blocks). For example, if in eight pieces of SI (SIB 1 to SIB 8), SIB 1 and SIB 2 have a binding sending relationship, SIB 3 and SIB 4 have a binding sending relationship, SIB 5 and SIB 6 have a binding sending relationship, and SIB 7 and SIB 8 have a binding sending relationship, the first indication information only needs to indicate sending statuses of SIBs 1, 3, 5, and 7 corresponding to different SS/PBCH blocks, or only needs to indicate sending statuses of SIBs 2, 4, 6, and 8 corresponding to different SS/PBCH blocks.

In other words, the first indication information may indicate a mapping between one or more downlink signal blocks and only one of the plurality of pieces of SI, and the plurality of pieces of SI have a binding sending relationship. Herein, that the plurality of pieces of SI have a binding sending relationship means that downlink signal blocks corresponding to the plurality of pieces of SI are the same and the plurality of pieces of SI need to be sent together. To be specific, the plurality of pieces of SI are transmitted together or not transmitted together in a same beam direction. Optionally, a plurality of pieces of SI of a same type have a binding sending relationship, and need to be sent together.

Optionally, SI that needs to be sent together (that is, SI having a binding sending relationship) may be indicated by the network device 500. The communications unit 501 in the network device 500 may send third indication information, where the third indication information may indicate SI that needs to be sent together. Optionally, the third indication information may indicate SI of a same type, and the SI of a same type needs to be sent together. Optionally, SI that needs to be sent together may alternatively be statically defined in a protocol or configured by the network device 500 by using higher layer signaling (for example, RRC signaling). For example, SI of a type same as the type of the SI statically defined in the protocol or configured by using the higher layer signaling needs to be sent together.

Optionally, when the SI is specifically on-demand OSI, the third indication information may be carried in one or more of the following: remaining minimum system information RMSI and an SS/PBCH block. This is not limited thereto, and the third indication information may alternatively be carried in independent signaling. (3) Manner 3: In addition to separately using the foregoing Manner 1 or the foregoing Manner 2 to indicate the sending status of the SI, the communications unit 501 in the network device 500 may alternatively use both the foregoing Manner 1 and the foregoing Manner 2 to indicate the sending status of the SI, so that signaling overheads can be reduced to a greater extent.

In this application, a resource configuration manner of SI may include:

Manner 1: A time location that corresponds to a downlink signal block and that is used to send SI is preconfigured. Specifically, a time location of SI having a QCL with a downlink signal block is a preset time location that corresponds to the downlink signal block in a first time window and that is used to send SI.

In a possible case, a blank symbol may exist between preset time locations, in the first time window, corresponding to downlink signal blocks corresponding to SI transmitted by the communications unit 501 in the network device 500. The blank symbol is a symbol that is not occupied by the SI. In an NRU scenario, the blank symbol causes discontinuous transmission, resulting in a channel loss. In this regard, optionally, the blank symbol may be filled by a second downlink signal, to avoid the channel loss caused by the discontinuous data transmission. The second downlink signal may be a downlink data signal or the like.

In Manner 1, for the specific terminal 600, the communications unit 603 in the terminal 600 may receive the SI at a preset time location corresponding to the portion of downlink signal blocks in the first time window. The portion of downlink signal blocks have a QCL with the SI transmitted by the network device for the terminal.

Manner 2: A time location for sending SI is dynamically allocated by the network device 500. Specifically, the network device 500 dynamically allocates time locations of SI having a QCL with downlink signal blocks, so that the SI is continuously sent. In other words, in Manner 2, time locations at which the communications unit 501 in the network device 500 transmits the SI are continuous. In this way, a blank symbol can be avoided. For an unlicensed spectrum, the network device 500 does not need to fill a second downlink signal during transmission of the SI.

In Manner 2, the communications unit 501 in the network device 500 may send fourth indication information, where the fourth indication information indicates time locations at which SI having a QCL with different downlink signal blocks is actually transmitted by the network device 500. For the specific terminal 600, the communications unit 603 in the terminal 600 may receive the fourth indication information, determine, based on the fourth indication information, a time location of SI having a QCL with the portion of downlink signal blocks, and receive the SI at the time location. The portion of downlink signal blocks have a QCL with the SI transmitted by the communications unit 603 in the network device 600 for the terminal. Optionally, the communications unit 603 in the terminal 600 may alternatively receive the SI through blind detection, and the network device 500 does not need to send the fourth indication information.

In an unlicensed band, for a specific terminal, the communications unit 501 in the network device 500 may perform LBT on an antenna port having a QCL with the portion of downlink signal blocks. If the LBT passes, the communications unit 501 in the network device 500 only transmits system information SI having a QCL with the portion of downlink signal blocks. In other words, for the specific terminal, the communications unit 501 in the network device 5X) can transmit the SI in a direction of a portion of base station transmitted beams only by performing LBT in the direction of the portion of base station transmitted beams instead of directions of all base station transmitted beams. In this way, the LBT success probability can be increased, and the probability of successfully sending the SI can be increased, because directional LBT is easier than omnidirectional LBT.

It may be understood that for specific implementations of the functional units included in the network device 500 and the terminal 600, refer to the foregoing method embodiments. Details are not described herein again.

In addition, an embodiment of the present invention further provides a wireless communications system. The wireless communications system may be the wireless communications system 10 shown in FIG. 2, or may be the wireless communications system 10 shown in FIG. 14, and may include a network device and a terminal. The terminal may be the terminal in the foregoing embodiments, and the network device may be the network device in the foregoing embodiments. Specifically, the terminal may be the terminal 300 shown in FIG. 12, and the network device may be the network device 400 shown in FIG. 13. Alternatively, the terminal may be the terminal 600 in the embodiment of FIG. 14, and the network device may be the network device 500 in the embodiment of FIG. 14. For specific implementations of the network and the terminal, refer to the foregoing embodiments. Details are not described herein again.

The network device shown in FIG. 13 is used as an example. The network device processor 401 is configured to control the transmitter 407 to perform sending in an unlicensed band and/or a licensed band, and control the receiver 409 to perform receiving in the unlicensed band and/or the licensed band. The transmitter 407 is configured to support the network device in performing a process of transmitting data and/or signaling. The receiver 409 is configured to support the network device in performing a process of receiving data and/or signaling. The memory 405 is configured to store program code and data of the network device.

In this application, the transmitter 407 may be mainly configured to send system information SI and first indication information. For one specific terminal, SI transmitted by a transmitter 407 has a QCL with only a portion of downlink signal blocks. In other words, for the specific terminal, the transmitter 407 transmits the SI only in a direction of a beam carrying the portion of downlink signal blocks. The specific terminal is located in coverage of the beam carrying the portion of downlink signal blocks, and can detect the SI transmitted by the network device in the direction of the beam. The first indication information may indicate a mapping between a downlink signal block and SI, and the downlink signal block has a QCL with the SI corresponding to the downlink signal block. In other words, the first indication information may indicate a case in which different base station transmitted beams carry SI, that is, indicate which pieces of SI are carried or not carried in different base station transmitted beams.

In this application, the receiver 409 may be configured to receive an SI request sent by the terminal.

For a specific implementation of components in the network device, refer to the foregoing method embodiments. Details are not described herein again.

The terminal shown in FIG. 12 is used as an example. The terminal processor 304 is configured to invoke the instruction stored in the memory 312 to control the transmitter 306 to perform sending in an unlicensed band and/or a licensed band, and control the receiver 308 to perform receiving in the unlicensed band and/or the licensed band. The transmitter 306 is configured to support the terminal in performing a process of transmitting data and/or signaling. The receiver 308 is configured to support the terminal in performing a process of receiving data and/or signaling. The memory 312 is configured to store program code and data of the terminal.

In this application, the transmitter 306 may be configured to transmit an SI request.

In this application, the receiver 308 may be configured to receive SI and first indication information that are sent by the network device. For one specific terminal, SI received by a receiver 308 of the terminal has a QCL with only a portion of downlink signal blocks. In other words, for the specific terminal, the network device transmits the SI only in a direction of a beam carrying the portion of downlink signal blocks. The specific terminal is located in coverage of the beam carrying the portion of downlink signal blocks, and can detect the SI transmitted by the network device in the direction of the beam. The first indication information may indicate a mapping between a downlink signal block and SI, and the downlink signal block has a QCL with the SI corresponding to the downlink signal block. In other words, the first indication information may indicate a case in which different base station transmitted beams carry SI, that is, indicate which pieces of SI are carried or not carried in different base station transmitted beams.

For a specific implementation of components in the terminal, refer to the foregoing method embodiments. Details are not described herein again.

Figure 15:
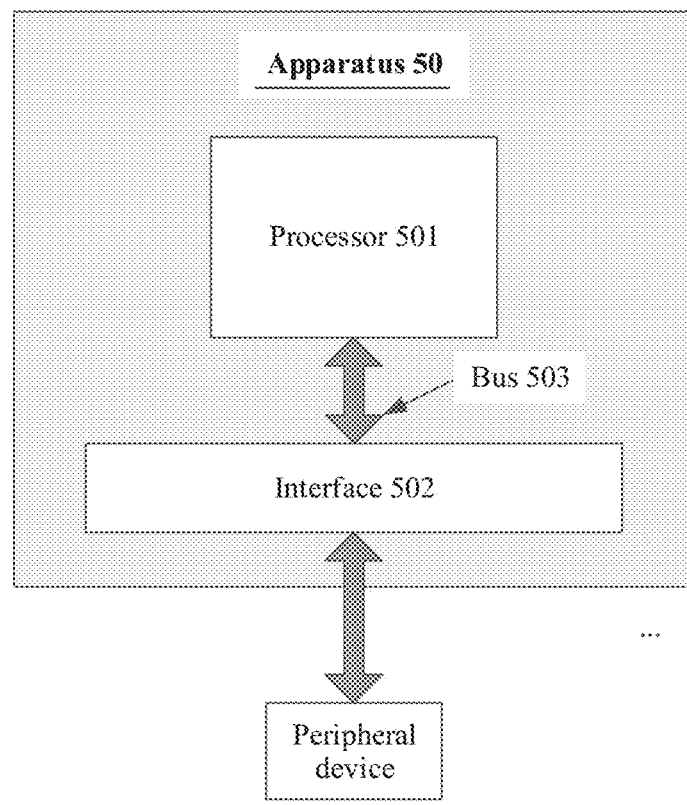
FIG. 15 is a schematic structural diagram of a processor according to this application.

FIG. 15 is a schematic structural diagram of an apparatus according to this application. As shown in FIG. 15, the apparatus 50 may include a processor 501 and one or more interfaces 502 coupled to the processor 501.

The processor 501 may be configured to read and execute a computer-readable instruction. During specific implementation, the processor 501 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, or may perform an address operation and an address conversion. The register is mainly responsible for storing a quantity of register operations, intermediate operation results, and the like that are temporarily stored during instruction execution. During specific implementation, a hardware architecture of the processor 501 may be an application-specific integrated circuit (Application-Specific Integrated Circuit, ASIC) architecture, an MIPS architecture, an ARM architecture, an NP architecture, or the like. The processor 501 may be a single-core processor, or may be a multi-core processor.

The interface 502 may be configured to input to-be-processed data to the processor 501, and may output a processing result of the processor 501. During specific implementation, the interface 502 may be a general-purpose input/output (General-Purpose Input/Output, GPIO) interface, and may be connected to a plurality of peripheral devices (for example, radio frequency modules). The interface 502 may further include a plurality of independent interfaces, for example, an Ethernet interface and a mobile communications interface (for example, an X1 interface), which are separately responsible for communication between different peripheral devices and the processor 501.

In this application, the processor 501 may be configured to invoke, from a memory, a program for implementing the system information transmission method on a network device side or a terminal side according to one or more embodiments of this application, and execute an instruction included in the program. The interface 502 may be configured to output an execution result of the processor 501. In this application, the interface 502 may be specifically configured to output the processing result of the processor 501. For the system information transmission method provided in one or more embodiments of this application, refer to the foregoing embodiments. Details are not described herein again.

It should be noted that functions corresponding to the processor 501 and the interface 502 may be implemented by using a hardware design, or may be implemented by using a software design, or may be implemented by using a combination of software and hardware. This is not limited herein.

Methods or algorithm steps described in combination with the content disclosed in the embodiments of the present invention may be implemented by hardware, or may be implemented by a processor executing a software instruction. The software instruction may include a corresponding software module. The software module may be stored in a RAM, a flash memory, a ROM, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a transceiver or a relay device. Certainly, the processor and the storage medium may exist in a wireless access network device or a terminal device as discrete components.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementation of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A network device, comprising a memory, a processor coupled to the memory, a transmitter, and a receiver, wherein
the receiver is configured to receive a system information request sent by one or more terminals;
the transmitter is configured to transmit system information (SI), wherein SI is transmitted for one terminal has a quasi co-location (QCL) with a portion of downlink signal blocks, and the portion of downlink signal blocks are a subset of all downlink signal blocks transmitted by the network device; and
the transmitter is further configured to send first indication information, wherein the first indication information indicates a mapping between a downlink signal block and SI, and the downlink signal block has a QCL with the SI corresponding to the downlink signal block.

2. The network device according to claim 1, wherein the first indication information comprises H groups of bits, each group comprises M bits, one bit corresponds to one piece of SI, and a $j^{th}$ bit in an $i^{th}$ group indicates whether a $j^{th}$ piece of SI corresponding to an $i^{th}$ downlink signal block has been sent, wherein H is a positive integer, M is a positive integer, $i \in (1, H)$, $j \in (1, M)$, i is a positive integer, and j is a positive integer.

3. The network device according to claim 1, wherein the first indication information indicates a mapping between one of a plurality of downlink signal blocks and SI, and the plurality of downlink signal blocks have a QCL.

4. The network device according to claim 3, wherein the transmitter is further configured to send second indication information, wherein the second indication information indicates the downlink signal blocks having the QCL, and SI corresponding to the downlink signal blocks having the QCL is the same.

5. The network device according to claim 1, wherein the first indication information indicates a mapping between one or more downlink signal blocks and one of a plurality of pieces of SI, downlink signal blocks corresponding to the plurality of pieces of SI are the same, and the plurality of pieces of SI need to be sent together.

6. The network device according to claim 5, wherein the transmitter is further configured to send third indication information, wherein the third indication information indicates that the downlink signal blocks corresponding to the plurality of pieces of SI are the same, and the plurality of pieces of SI need to be sent together.

7. The network device according to claim 1, wherein for a specific terminal, the transmitter is configured to:
perform listen before talk (LBT) on an antenna port having a QCL with the portion of downlink signal blocks; and
if the LBT passes, transmit the SI having the QCL with the portion of downlink signal blocks.

8. The network device according to claim 1, wherein a time location of the SI having the QCL with the downlink signal block is a preset time location that corresponds to the downlink signal block in a first time window and that is used to send SI; and
if a blank symbol exists between preset time locations, in the first time window, corresponding to downlink signal blocks corresponding to SI transmitted by the network device, the blank symbol is filled by a downlink signal block, wherein the blank symbol is a symbol that is not occupied by the SI.

9. The network device according to claim 1, wherein time locations of SI transmitted by the network device are continuous and adjacent; and the transmitter is configured to transmit fourth indication information, wherein the fourth indication information indicates a time location of the SI transmitted by the network device.

10. A terminal, comprising:
a receiver configured to receive first indication information sent by a network device, wherein the first indication information indicates a mapping between a downlink signal block and system information (SI), and the downlink signal block has a quasi co-location (QCL) with the SI corresponding to the downlink signal block;

at least one processor; and one or more memories coupled to the at least one processor and storing programming instructions for execution by the at least one processor to:

determine whether SI that has a QCL with a downlink signal block received by the terminal and that is required by the terminal has been sent based on the first indication information; and if the SI has been sent, the receiver is configured to detect the SI at a time location that corresponds to the downlink signal block received by the terminal and that is used to receive SI.

11. The terminal according to claim 10, further comprising a transmitter, wherein the transmitter is configured to: if the SI having the QCL with the downlink signal block received by the receiver has not been sent, send a system information request to the network device; and the receiver is further configured to receive SI transmitted by the network device, wherein the SI transmitted by the network device for the terminal has a QCL with a portion of downlink signal blocks, and the portion of downlink signal blocks are a subset of all downlink signal blocks transmitted by the network device.

12. The terminal according to claim 10, wherein the first indication information comprises H groups of bits, each group of bits comprises M bits, one bit corresponds to one piece of SI, and a $j^{th}$ bit in an $i^{th}$ group of bits indicates whether a $j^{th}$ piece of SI corresponding to an $i^{th}$ downlink signal block has been sent, wherein H is a positive integer, M is a positive integer, $i \in (1, H)$, $j \in (1, M)$, i is a positive integer, and j is a positive integer.

13. The terminal according to claim 10, wherein the first indication information indicates a mapping between one of a plurality of downlink signal blocks and SI corresponding to the one downlink signal block, and the plurality of downlink signal blocks have a QCL.

14. The terminal according to claim 13, wherein the receiver is further configured to receive second indication information, wherein the second indication information indicates the downlink signal blocks having the QCL, and SI corresponding to the downlink signal blocks having the QCL is the same.

15. The terminal according to claim 10, wherein the first indication information indicates a mapping between one or more downlink signal blocks and one of a plurality of pieces of SI, downlink signal blocks corresponding to the plurality of pieces of SI are the same, and the plurality of pieces of SI need to be sent together.

16. The terminal according to claim 11, wherein a time location of the SI having the QCL with the downlink signal block is a preset time location that corresponds to the downlink signal block in a first time window and that is used to send SI; and when a blank symbol exists between preset time locations, in the first time window, corresponding to downlink signal blocks corresponding to SI transmitted by the network device, the blank symbol is filled by a first downlink signal, wherein the blank symbol is a symbol that is not occupied by the SI.

17. The terminal according to claim 16, wherein the receiver is further configured to receive the SI at a preset time location corresponding to the portion of downlink signal blocks in the first time window.

18. The terminal according to claim 11, wherein time locations of SI transmitted by the network device are continuous and adjacent; and the receiver is configured to receive fourth indication information, wherein the fourth indication information indicates a time location of the SI transmitted by the network device.

19. The terminal according to claim 18, wherein the receiver is configured to receive based on the fourth indication information, the SI at the time location of the SI transmitted by the network device.

20. A system information transmission method, comprising:

receiving, by a terminal, first indication information sent by a network device, wherein the first indication information indicates a mapping between a downlink signal block and system information (SI), and the downlink signal block has a quasi co-location (QCL) with the SI corresponding to the downlink signal block;

determining, by the terminal based on the first indication information, whether SI that has a QCL with a downlink signal block received by the terminal and that is required by the terminal has been sent; and if the SI has been sent, detecting the SI at a time location that corresponds to the downlink signal block received by the terminal and that is used to receive SI.

* * * * *

UNITED STATES PATENT AND TRADEMARK OFFICE
CERTIFICATE OF CORRECTION

| | | |
|---|---|---|
| PATENT NO. | : 11,856,560 B2 | Page 1 of 1 |
| APPLICATION NO. | : 17/172432 | |
| DATED | : December 26, 2023 | |
| INVENTOR(S) | : Ji Wu, Jun Zhu and Qiong Jia | |

It is certified that error appears in the above-identified patent and that said Letters Patent is hereby corrected as shown below:

In the Specification

Column 1, Line 9, please delete "PCT/CN2019.100094," and insert therefore
-- PCT/CN2019/100094, --.

Signed and Sealed this
Twenty-second Day of October, 2024

Katherine Kelly Vidal
*Director of the United States Patent and Trademark Office*